（12）United States Patent
Crum

(10) Patent No.: US 11,862,045 B1
(45) Date of Patent: *Jan. 2, 2024

(54) DUPLEX LABEL WITH DISPLACEABLE LINER AND METHODS OF MAKING AND USING SAME

(71) Applicant: Ward-Kraft, Inc., Fort Scott, KS (US)

(72) Inventor: Jesse D. Crum, Fort Scott, KS (US)

(73) Assignee: Rekon, LLC, Pittsburg, KS (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/228,434

(22) Filed: Apr. 12, 2021

Related U.S. Application Data

(63) Continuation-in-part of application No. 17/068,706, filed on Oct. 12, 2020, and a continuation-in-part of
(Continued)

(51) Int. Cl.
| | |
|---|---|
| *B29C 65/00* | (2006.01) |
| *G09F 3/10* | (2006.01) |
| *G09F 3/02* | (2006.01) |
| *C09J 7/38* | (2018.01) |
| *C09J 7/40* | (2018.01) |

(Continued)

(52) U.S. Cl.
CPC ................... *G09F 3/10* (2013.01); *C09J 7/35* (2018.01); *C09J 7/38* (2018.01); *C09J 7/401* (2018.01); *G09F 3/02* (2013.01); *B29C 65/48* (2013.01); *B29C 65/481* (2013.01); *B29C 66/004* (2013.01); *B29C 66/43* (2013.01); *B32B 7/14* (2013.01); *B32B 37/26* (2013.01); *C09J 2203/334* (2013.01); *G09F 2003/0241* (2013.01)

(58) Field of Classification Search
CPC ..... B29C 65/48; B29C 65/481; B29C 66/004; B29C 66/43; B32B 37/26; B32B 7/14
See application file for complete search history.

(56) References Cited

U.S. PATENT DOCUMENTS

| | | | |
|---|---|---|---|
| 2,178,979 A | 11/1939 | Von et al. | |
| 3,574,153 A | 4/1971 | Julius | |

(Continued)

FOREIGN PATENT DOCUMENTS

| | | |
|---|---|---|
| WO | 2011085790 A2 | 7/2011 |
| WO | 2018081922 A1 | 5/2018 |

OTHER PUBLICATIONS

Final Office Action, dated Mar. 22, 2022, 26 pages, issued in U.S. Appl. No. 16/593,358.
(Continued)

*Primary Examiner* — Philip C Tucker
*Assistant Examiner* — Nickolas R Harm
(74) *Attorney, Agent, or Firm* — AVEK IP, LLC

(57) ABSTRACT

Methods of making labels devoid of liner plies. A method of making a label for securement to a substrate comprises providing a face ply having a top side and a bottom side. The method includes disposing a hotmelt adhesive on the bottom side in a pattern. The method comprises formulating a liner coating configured to be activated by a fluid. The method includes disposing the liner coating on the bottom side outwardly adjacent the hotmelt adhesive. The bottom side is configured to be secured to a substrate via the hotmelt adhesive upon activation of the liner coating by the fluid.

17 Claims, 27 Drawing Sheets

Related U.S. Application Data application No. 16/593,358, filed on Oct. 4, 2019, said application No. 17/068,706 is a continuation-in-part of application No. 16/239,258, filed on Jan. 3, 2019, now Pat. No. 10,836,936, which is a continuation-in-part of application No. 16/144,583, filed on Sep. 27, 2018, now Pat. No. 10,726,746, said application No. 16/593,358 is a continuation-in-part of application No. 16/144,583, filed on Sep. 27, 2018, now Pat. No. 10,726,746.

(60) Provisional application No. 63/008,274, filed on Apr. 10, 2020, provisional application No. 62/913,550, filed on Oct. 10, 2019, provisional application No. 62/741,511, filed on Oct. 4, 2018, provisional application No. 62/563,942, filed on Sep. 27, 2017.

(51) Int. Cl.
*C09J 7/35* (2018.01)
*B32B 37/26* (2006.01)
*B32B 7/14* (2006.01)
*B29C 65/48* (2006.01)

(56) References Cited

U.S. PATENT DOCUMENTS

| | | | |
|---|---|---|---|
| 4,575,525 A | | 3/1986 | Wacome et al. |
| 4,623,688 A | | 11/1986 | Flanagan |
| 5,296,535 A | | 3/1994 | Nesiewicz et al. |
| 5,931,098 A | | 8/1999 | Bates |
| 5,977,021 A | | 11/1999 | Aoyama et al. |
| 6,080,250 A | | 6/2000 | Urban et al. |
| 6,080,261 A | * | 6/2000 | Popat ................. B41M 5/0256 156/239 |
| 6,124,417 A | * | 9/2000 | Su ..................... B44C 1/1737 526/318.4 |
| 6,277,229 B1 | * | 8/2001 | Popat ................... B44C 1/1741 156/289 |
| 6,540,865 B1 | * | 4/2003 | Miekka .................... C09J 7/38 156/289 |
| 6,589,623 B2 | | 7/2003 | Roth |
| 6,616,189 B2 | | 9/2003 | Raming |
| 6,787,208 B2 | | 9/2004 | Galovic |
| 8,109,537 B2 | | 2/2012 | Raming |
| 8,129,010 B2 | | 3/2012 | Kobayashi et al. |
| 8,287,961 B2 | | 10/2012 | Hill et al. |
| 8,802,591 B2 | | 8/2014 | Hill et al. |
| 9,418,576 B2 | | 8/2016 | Franklin |
| 9,767,714 B2 | | 9/2017 | Franklin |
| 2003/0012910 A1 | | 1/2003 | Galovic |
| 2004/0129378 A1 | | 7/2004 | Galovic |
| 2006/0216537 A1 | | 9/2006 | Natsui et al. |
| 2008/0030019 A1 | | 2/2008 | Hofer et al. |
| 2009/0252905 A1 | | 10/2009 | Hill et al. |
| 2010/0156087 A1 | | 6/2010 | Raming |
| 2010/0259037 A1 | | 10/2010 | Hanrahan et al. |
| 2011/0033698 A1 | | 2/2011 | Woods et al. |
| 2011/0061802 A1 | | 3/2011 | Raming |
| 2013/0004686 A1 | | 1/2013 | Hill et al. |
| 2016/0052659 A1 | | 2/2016 | Bowers et al. |
| 2016/0351084 A1 | | 12/2016 | Franklin |
| 2019/0047738 A1 | | 2/2019 | Nishimura et al. |
| 2020/0071015 A1 | | 3/2020 | Fan et al. |

OTHER PUBLICATIONS

Non-Final Office Action, dated Apr. 1, 2022, 6 pages, issued in U.S. Appl. No. 17/068,706.
Non-Final Office Action, dated Aug. 17, 2021, 24 pages, issued in U.S. Appl. No. 16/593,358.
Notice of Allowance, dated Apr. 1, 2020, 14 pages, issued in U.S. Appl. No. 16/144,583.
Notice of Allowance, dated Aug. 12, 2022, 9 pages, issued in U.S. Appl. No. 16/593,358.
Notice of Allowance, dated Sep. 15, 2022, 8 pages, issued in U.S. Appl. No. 17/068,706.

* cited by examiner

US 11,862,045 B1

DUPLEX LABEL WITH DISPLACEABLE LINER AND METHODS OF MAKING AND USING SAME

RELATED APPLICATIONS

This application claims priority to U.S. Provisional Application No. 63/008,274, filed on Apr. 10, 2020. This application is also a continuation-in-part of U.S. application Ser. No. 17/068,706, filed on Oct. 12, 2020, which claims priority to U.S. Provisional Application No. 62/913,550, filed on Oct. 10, 2019, and the '706 Application is a continuation-in-part of U.S. application Ser. No. 16/239,258, filed on Jan. 3, 2019, now U.S. Pat. No. 10,836,936, issued Nov. 17, 2020, which was a continuation-in-part of U.S. application Ser. No. 16/144,583, filed Sep. 27, 2018, now U.S. Pat. No. 10,726,746, issued Jul. 28, 2020, which claims priority to U.S. provisional Patent Application No. 62/563,942, filed Sep. 27, 2017. This application is also a continuation-in-part of U.S. application Ser. No. 16/593,358, filed on Oct. 4, 2019, which claims priority to U.S. Provisional Patent Application No. 62/741,511, filed Oct. 4, 2018, and the '358 Application is a continuation-in-part of U.S. application Ser. No. 16/144,583, filed Sep. 27, 2018, now U.S. Pat. No. 10,726,746, issued Jul. 28, 2020. The disclosure of each of these applications is incorporated herein by reference in their entireties.

SUMMARY

In an embodiment, a method of making a label for securement to a substrate comprises providing a face ply having a top side and a bottom side. The method includes disposing a pressure sensitive adhesive on the bottom side in a pattern. The method comprises formulating a liner coating configured to be activated by a fluid. The method includes disposing the liner coating on the bottom side outwardly adjacent the pressure sensitive adhesive. The bottom side is configured to be secured to a substrate via the pressure sensitive adhesive upon activation of the liner coating by the fluid.

In another embodiment, a method of making a label for securement to a substrate comprises providing a face ply having a top side and a bottom side. The method includes disposing a hotmelt adhesive on the bottom side in a pattern. The method comprises formulating a liner coating configured to be activated by a fluid. The method includes disposing the liner coating on the bottom side outwardly adjacent the hotmelt adhesive. The bottom side is configured to be secured to a substrate via the hotmelt adhesive upon activation of the liner coating by the fluid.

In yet another embodiment, a method of making a label for securement to a substrate comprises providing a face ply having a top side and a bottom side. The method includes formulating a liner coating configured to be activated by a fluid. The liner coating comprises each of an enabler adhesive, a facilitator fluid, and a stabilizer. The method comprises disposing the liner coating on the bottom side. The bottom side is configured to be secured to a substrate upon activation of the liner coating by the fluid.

FIELD OF THE DISCLOSURE

The disclosure relates generally to the field of duplex labels. Specifically, the disclosure relates to duplex labels with a liner that disperses upon being moistened, and to methods of making and using such liners with labels and other products.

BRIEF DESCRIPTION OF THE SEVERAL VIEWS OF THE DRAWINGS

Illustrative embodiments of the present disclosure are described in detail below with reference to the attached drawing figures.

DETAILED DESCRIPTION

The disclosure relates generally to a displaceable liner usable in a plethora of applications requiring the attachment of one substrate to another, such as labels, tape, et cetera. These applications and the use of the novel displaceable liner therewith are discussed in-turn. The artisan will understand from the disclosure herein that the displaceable liner is usable in other applications that can benefit from selectively adhering one or more surfaces together (e.g., envelopes, building materials, signage, et cetera).

As is known, a shipping label is adhered to a package and identifies the sender and recipient of the package. Conventional shipping labels have a front face for the printing of indicia and a back face that is adhered to the package. Traditionally, the back face is covered with adhesive, and a liner is removably secured to the back face via this adhesive. Prior to use, the liner is removed, either by hand or otherwise, to expose the adhesive, and the label (specifically, the face ply thereof) is adhered to the package being delivered using the exposed adhesive. As is known, during transportation or otherwise before the label is adhered to a substrate (e.g., a package or other similar surface), the liner covers the adhesive to ensure that the label does not undesirably stick to objects (e.g., other labels, print heads, and/or other components of apparatus used to make and/or print the label) other than the substrate to which the label is to be adhered.

The label liner is traditionally a single-use, disposable object. Considering that there are many millions of shipping labels in use each day, disposal of these liners represents significant waste. It may be desirable to reduce this waste to lower the cost and the carbon footprint of labels in the world; particularly when this waste is reduced without adversely affecting the quality or capabilities of the label, or their ease of use.

Figure 1:
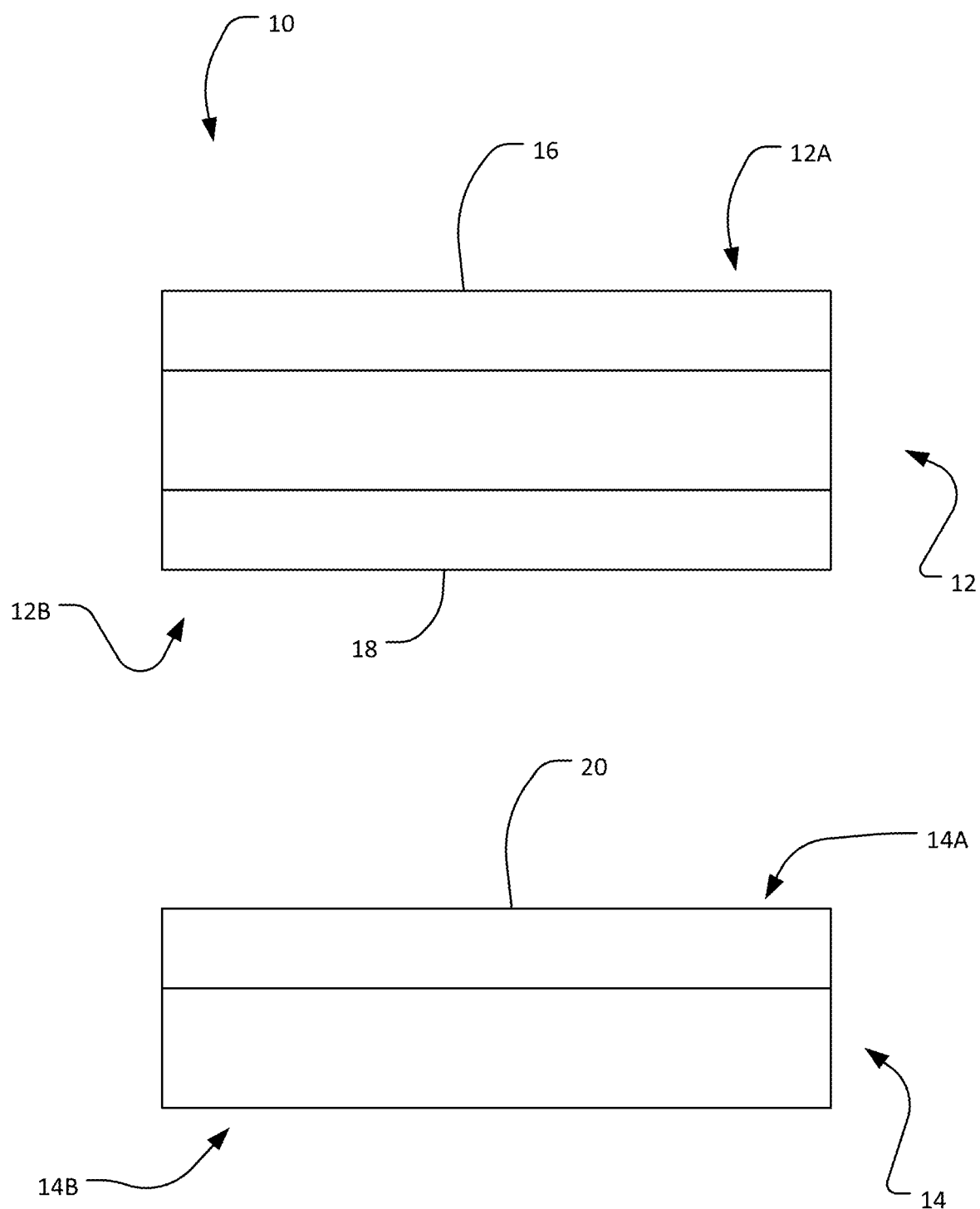
FIG. 1 is schematic representation of a PRIOR ART label.

FIG. 1 shows a conventional label 10, as is known in the art. The label 10 has a face ply (or face stock) 12 and a liner 14. The face ply 12 is typically made of paper. The face ply 12 has an upper side 12A and a lower side 12B. At least the top side 12A of the face ply 12 may contain a topcoat 16. The topcoat 16 is a coating configured for the reception of printed indicia and/or which otherwise improves the appearance or functionality of the face ply 12. A layer of adhesive 18 is disposed on the lower side 12B of the face ply 12 to allow the liner 14 to be coupled to the face ply 12.

The liner 14 is most commonly made of paper or polyester (PET). The prior art liner 14 may also be referred to herein as a liner ply because the prior art liner 14 comprises a ply (or multiple plies) of paper, polyester (e.g., film), et cetera. The liner ply 14 has a top side 14A and a bottom side 14B. The top side 14A of the liner ply 14 contains a release agent 20 (e.g., silicone), and the bottom side 14B may comprise paper or PET. The liner ply 14 is adhered to the face ply 12 such that the release agent 20 on the top side 14A of the liner ply 14 is adjacent and in contact with the adhesive 18 disposed on the lower side 12B of the face ply 12. The release agent 20 may ensure that the adhesion between the top ply 12 and the bottom ply 14 is releasable; that is, the liner ply 14 may be selectively disassociated from the face ply 12 to expose the adhesive 18 on the lower side 12B of the face ply.

In use, the liner ply 14 is releasably adhered to the face ply 12. The label 10 is then passed through the printer to print indicia on the topcoat 16. During the printing process, the liner ply 14 covers the adhesive 18 and ensures that the adhesive 18 does not interact with the printer. Once the printing is complete, the liner ply 14 is disassociated from the face ply 12 to expose the adhesive 18. The face ply 12 is then adhered to a substrate (e.g., a package, a box, an envelope, or other object or surface to which the label is adhered) via the adhesive 18, and the liner ply 14 is disposed in a trash can or elsewhere.

As noted, disposable liner plies represent significant waste and cost. The prior art indicates that efforts have been made to configure a label without a disposable liner. U.S. Pat. No. 8,109,537 illustrates one example of a label devoid of a disposable liner. The '537 Patent label includes a single ply that comprises adhesive on one side and a release material on the other. This "linerless" configuration allows for multiple labels to be removably overlaid to one another, e.g., on a roll. Specifically, the release material of the underlying label ensures that this label does not permanently adhere to the overlaid label because of the adhesive thereof.

As the '537 Patent's linerless labels are devoid of a conventional liner, they address at least some of the deficiencies associated with conventional liners. However, the '537 Patent's (and other such) linerless labels present other issues that must be addressed. Because a liner is absent from the label, the adhesive on the labels is exposed to the printer during the printing process. This exposed adhesive may cause the label to undesirably stick to the printer roller and necessitate expensive repairs. To alleviate this concern, the linerless labels are typically printed with specialty printing equipment having coated rollers (e.g., direct thermal printers having rollers comprising silicone embedded rubber) specifically adapted to ensure that the labels do not adhere thereto. Much if not all of the cost savings associated with the liner are lost in purchasing and configuring the specialty printing equipment, which is undesirable.

Furthermore, conventional linerless labels typically preclude easy customization of the label shape. For instance, applying a die-cut to a conventional linerless label may be difficult because the face ply lacks the structural support of a liner ply. Another issue with some conventional linerless labels lies in the adhesive used therein. Water based adhesives (e.g., remoistenable adhesives) typically used in conventional linerless labels require a relatively long time to dry, for instance. Conversely, thermal adhesives (e.g., hot melt adhesives) have a relatively quick drying time, though they are generally incompatible with certain printing methods. Importantly, an issue with conventional linerless labels is that the exposed nature of the adhesive prevents printing on the linerless label using most typical printing methods (e.g., laser printers, thermal transfer printers, or any printer other than direct thermal printers). It is to be understood that, when taking these many considerations into account, conventional linerless labels may have limited applicability.

Further concerns may stem from the adhesive used in conventional labels, such as remoistenable adhesives (i.e., adhesives that are "activated" and gain adhesive properties upon sufficient contact with a fluid such as water). Remoistenable adhesives may not only represent a significant portion of the label cost, but also a significant portion of the label size. Accordingly, the remoistenable adhesive layer in conventional labels contributes significantly to the size of the rolls of shipping labels, the amount of space required to ship and/or store the shipping label rolls, et cetera. The relatively large size of this adhesive layer adds cost to the shipping, storing, and production of the conventional shipping labels. Moreover, remoistenable adhesives may have other undesirable traits. For instance, conventional remoistenable adhesives may be difficult to handle due to their tackiness upon activation, which may foul up equipment, among other things. Further, manually handling a label with an activated remoistenable adhesive layer may cause the adhesive to get on the hands of the handler, which may be undesirable. As another example, conventional remoistenable adhesives typically require a large amount of water to activate and adhere to objects, which may add up over the application of many thousands of labels. Remoistenable adhesives also tend to curl and thus are typically unusable to secure objects having larger surface areas. These and other such drawbacks have caused the label industry to move away from remoistenable adhesives.

It may be advantageous to have a label that does not suffer from the disadvantages associated with conventional liners and/or conventional adhesives. It may further be desirable to have a label that does not suffer from the drawbacks of linerless labels, and which, like traditional labels having liners, can be printed using one of a variety of printing methods. The present disclosure may provide for such a label.

Figure 2:
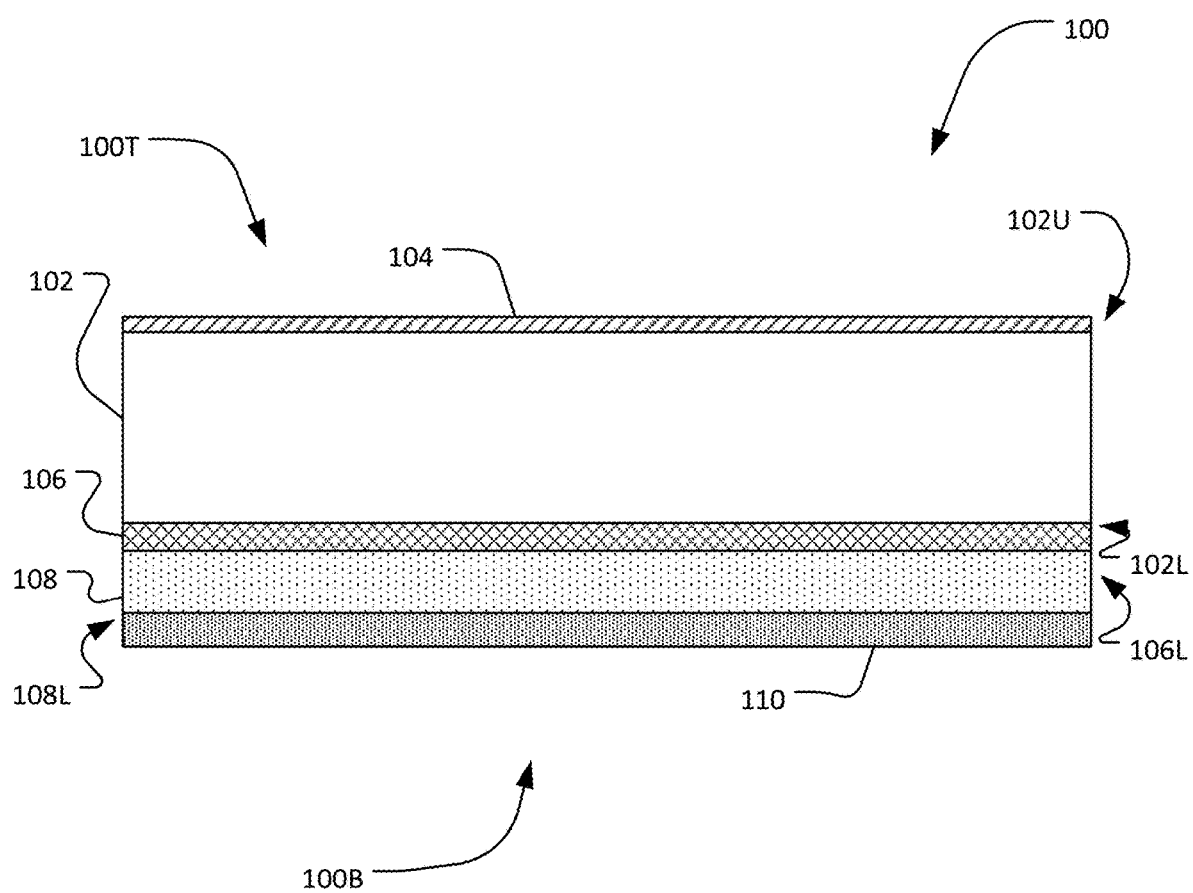
FIG. 2 is a schematic representation of a label employing a displaceable liner for adhering to a substrate, according to an embodiment of the disclosure.
Figure 5:
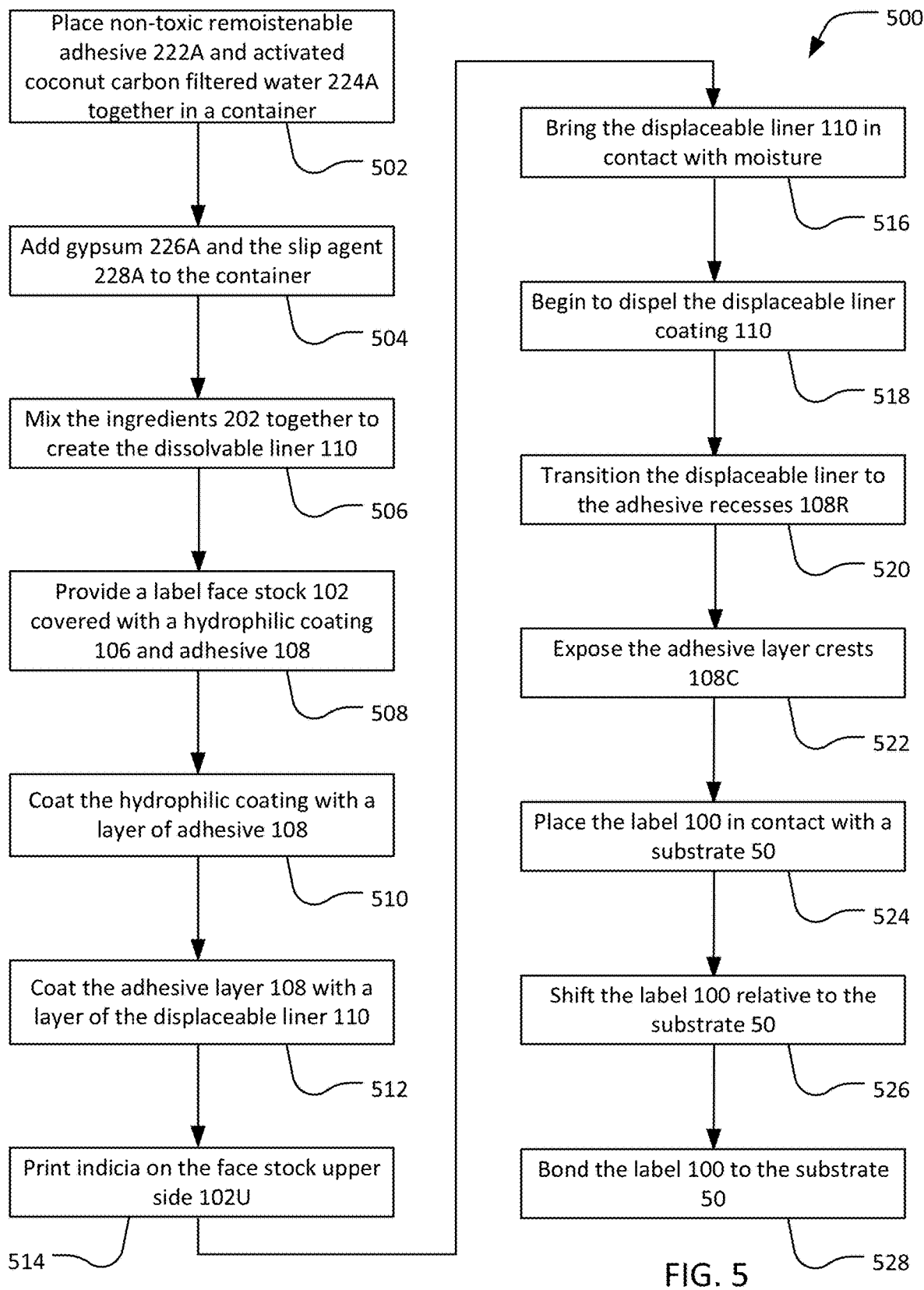
FIG. 5 is a flowchart illustrating a method of making and using the label employing the displaceable liner of FIG. 2.
Figure 6A:
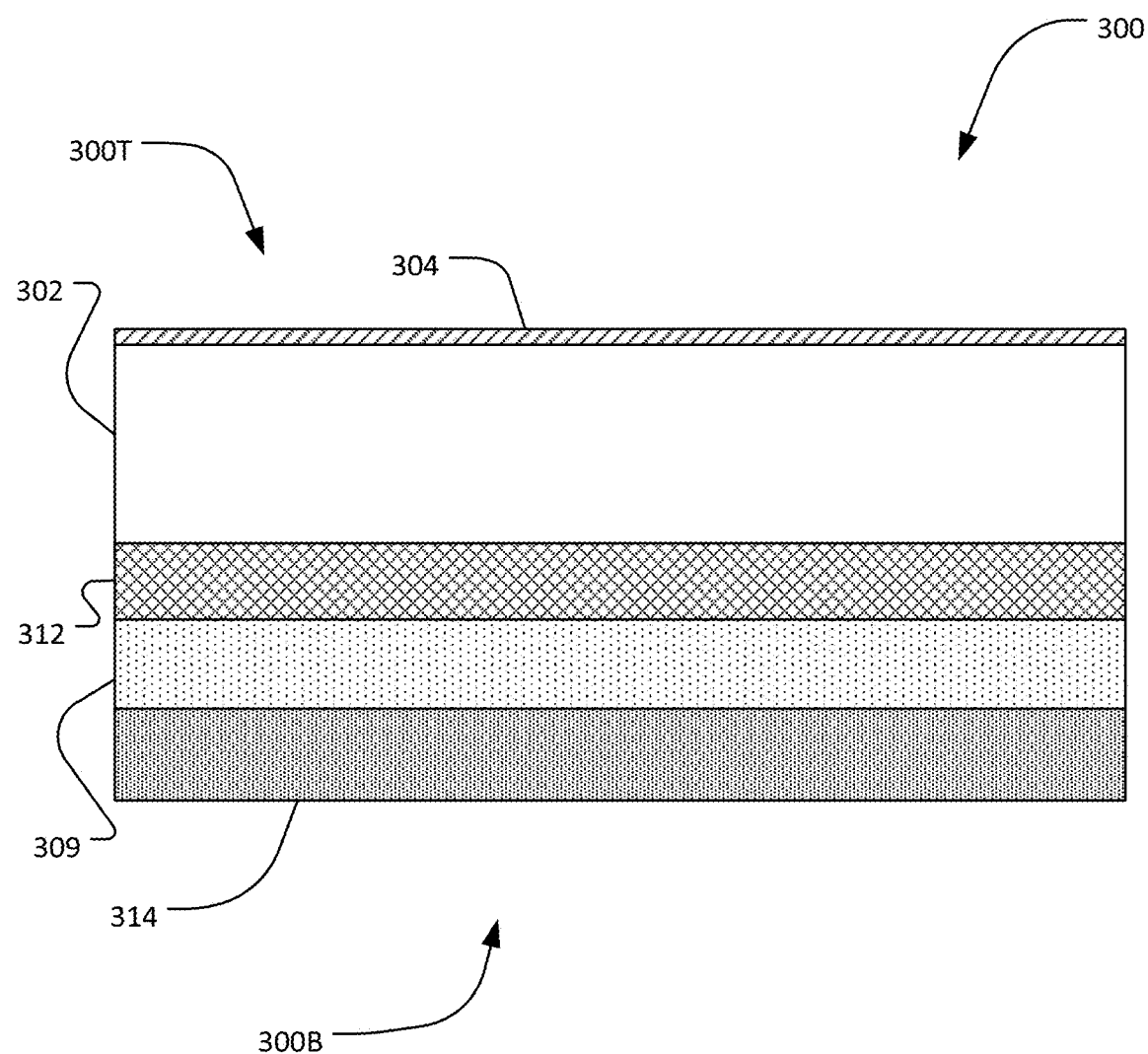
FIG. 6A is a schematic representation of a label employing a displaceable liner for adhering to a substrate, according to another embodiment of the disclosure.
Figure 6B:
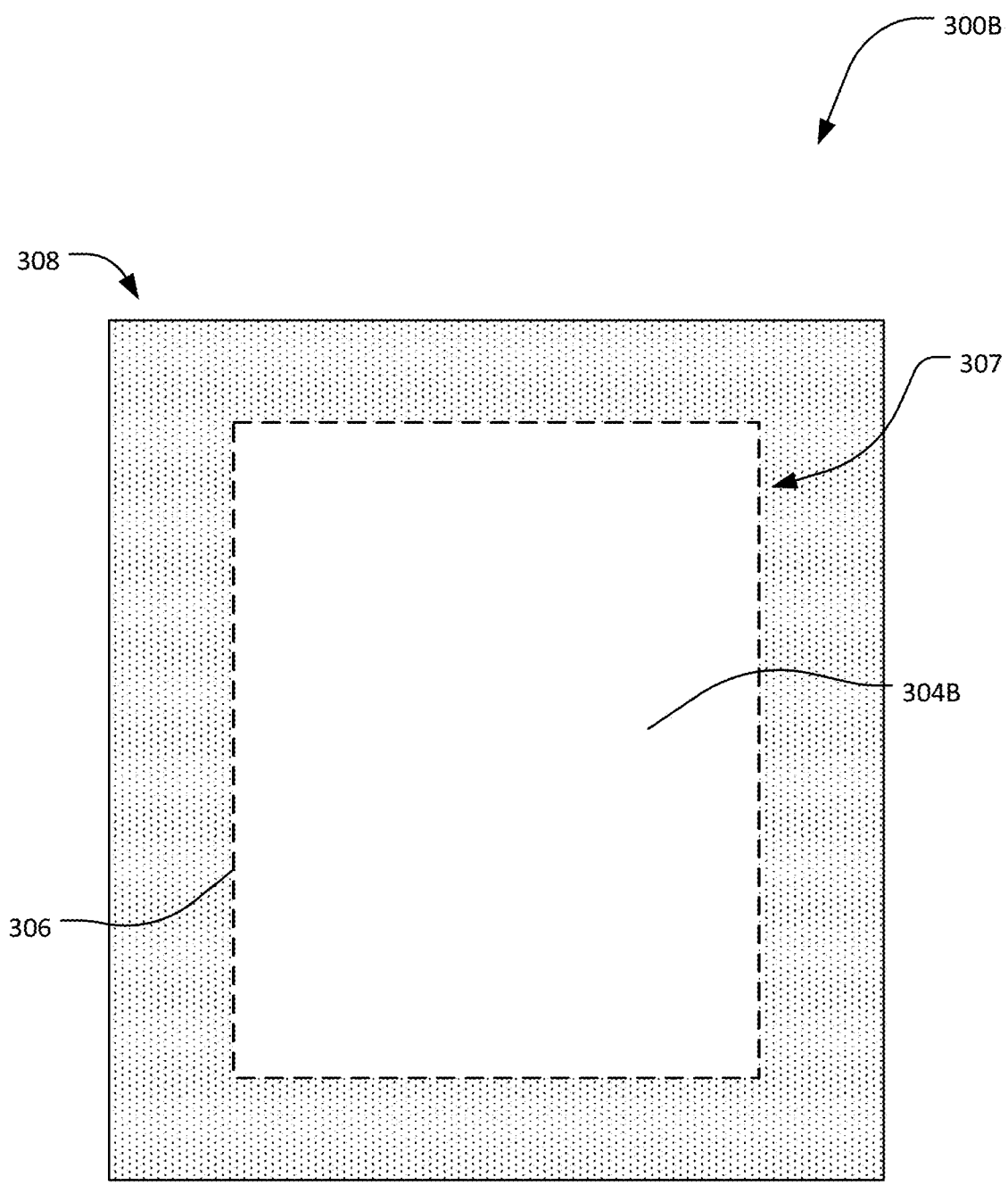
FIG. 6B is a bottom view of the label employing the displaceable liner of FIG. 6A.
Figure 7A:
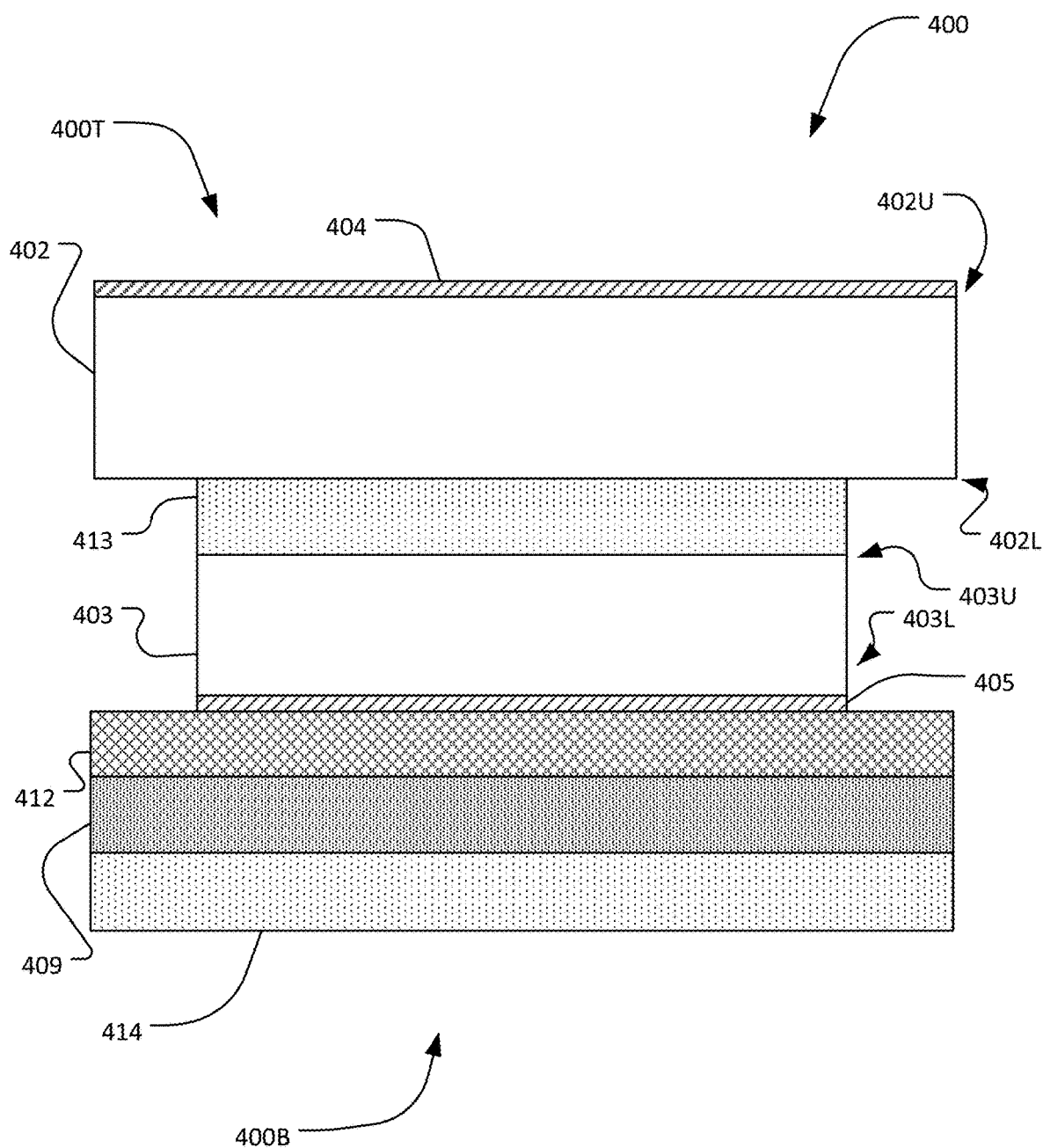
FIG. 7A is a schematic representation of a label employing a displaceable liner for adhering to a substrate, according to yet another embodiment of the disclosure.
Figure 7B:
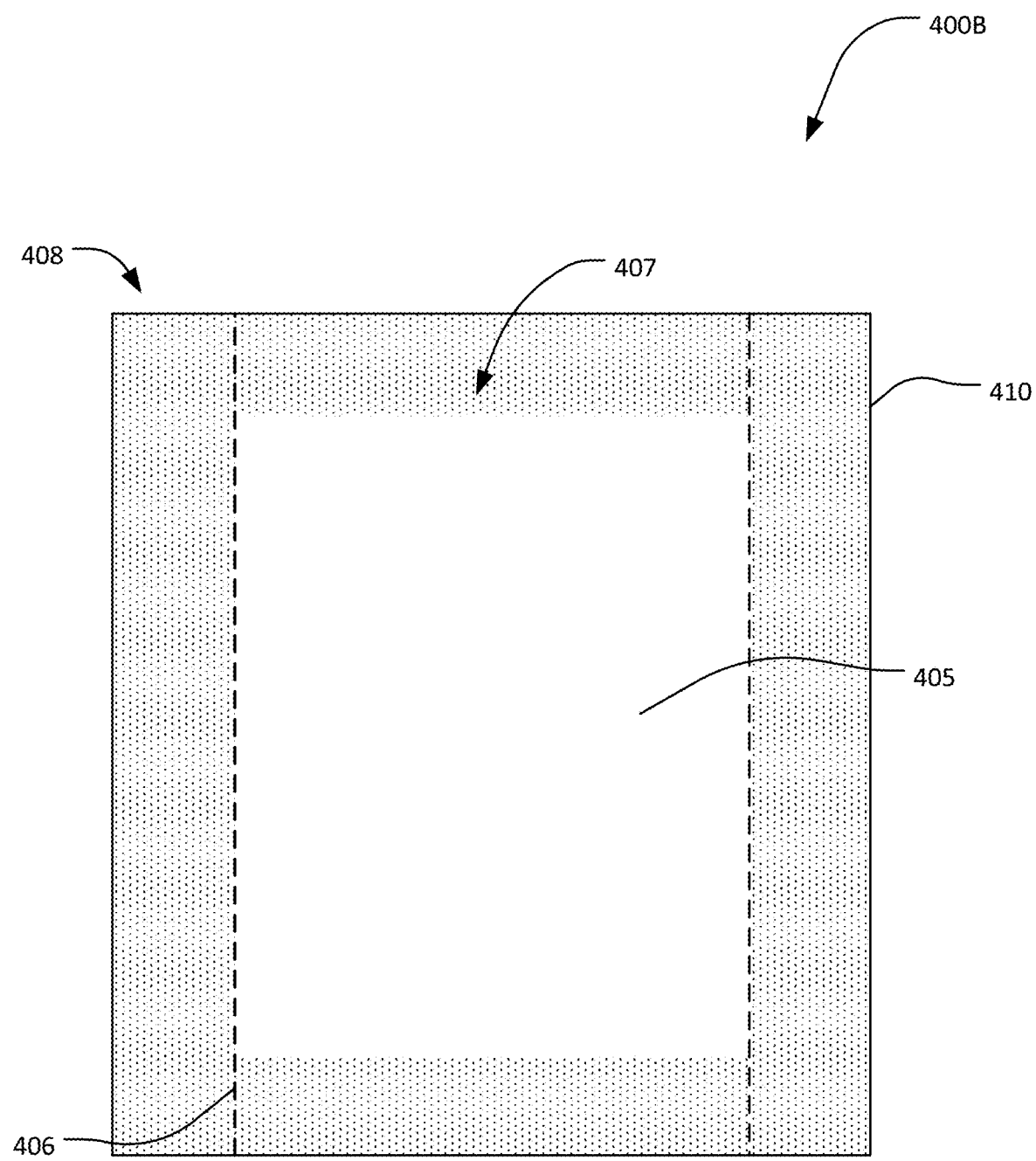
FIG. 7B is a bottom view of the label employing the displaceable liner of FIG. 7A.
Figure 7C:
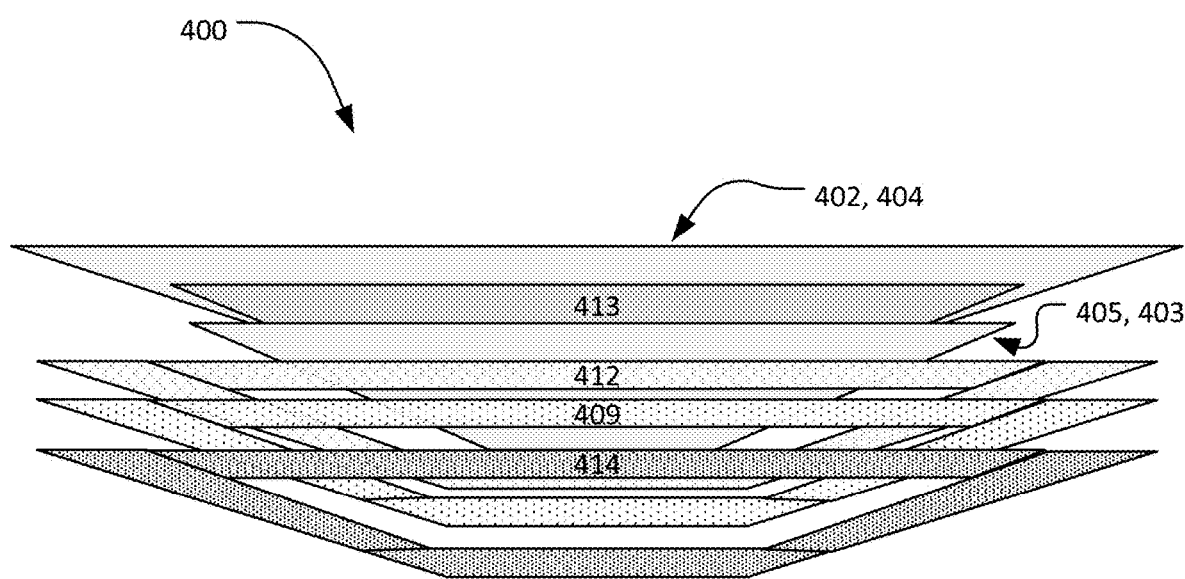
FIG. 7C is an exploded view of the label of FIG. 7A.
Figure 8A:
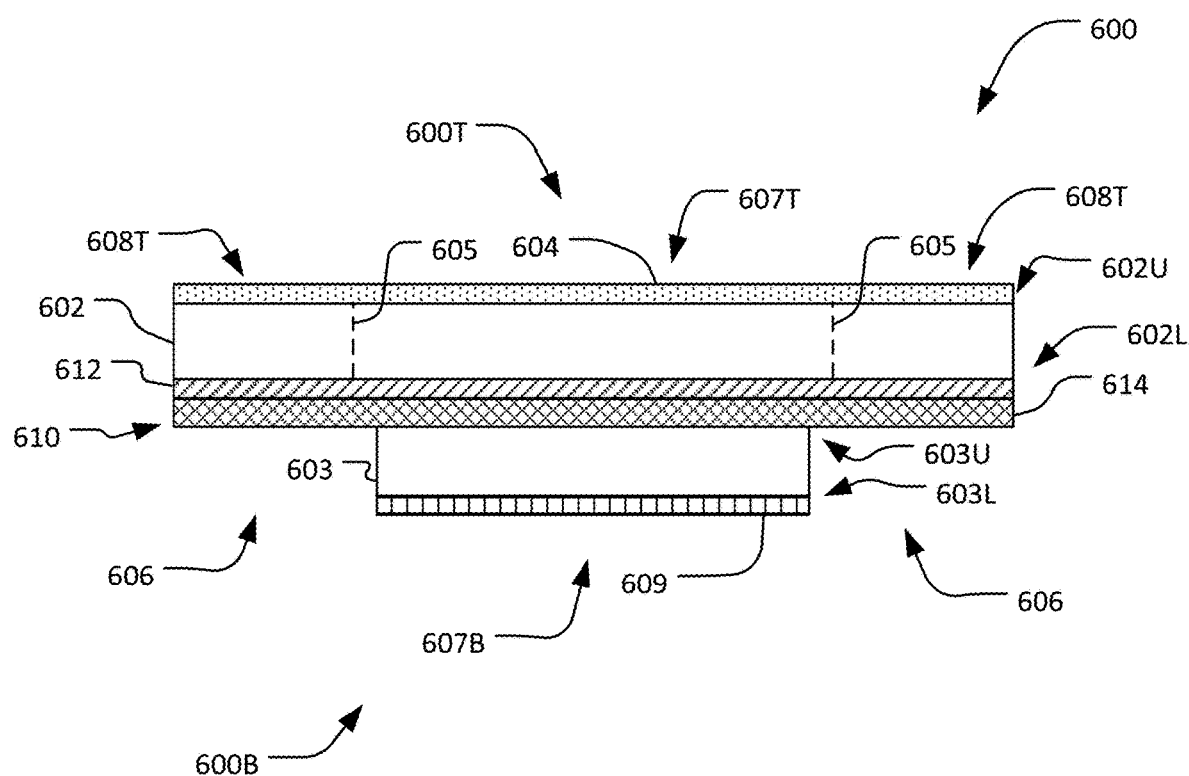
FIG. 8A is a schematic representation of a label employing a displaceable liner for adhering to a substrate, according to yet another embodiment of the disclosure.
Figure 8B:
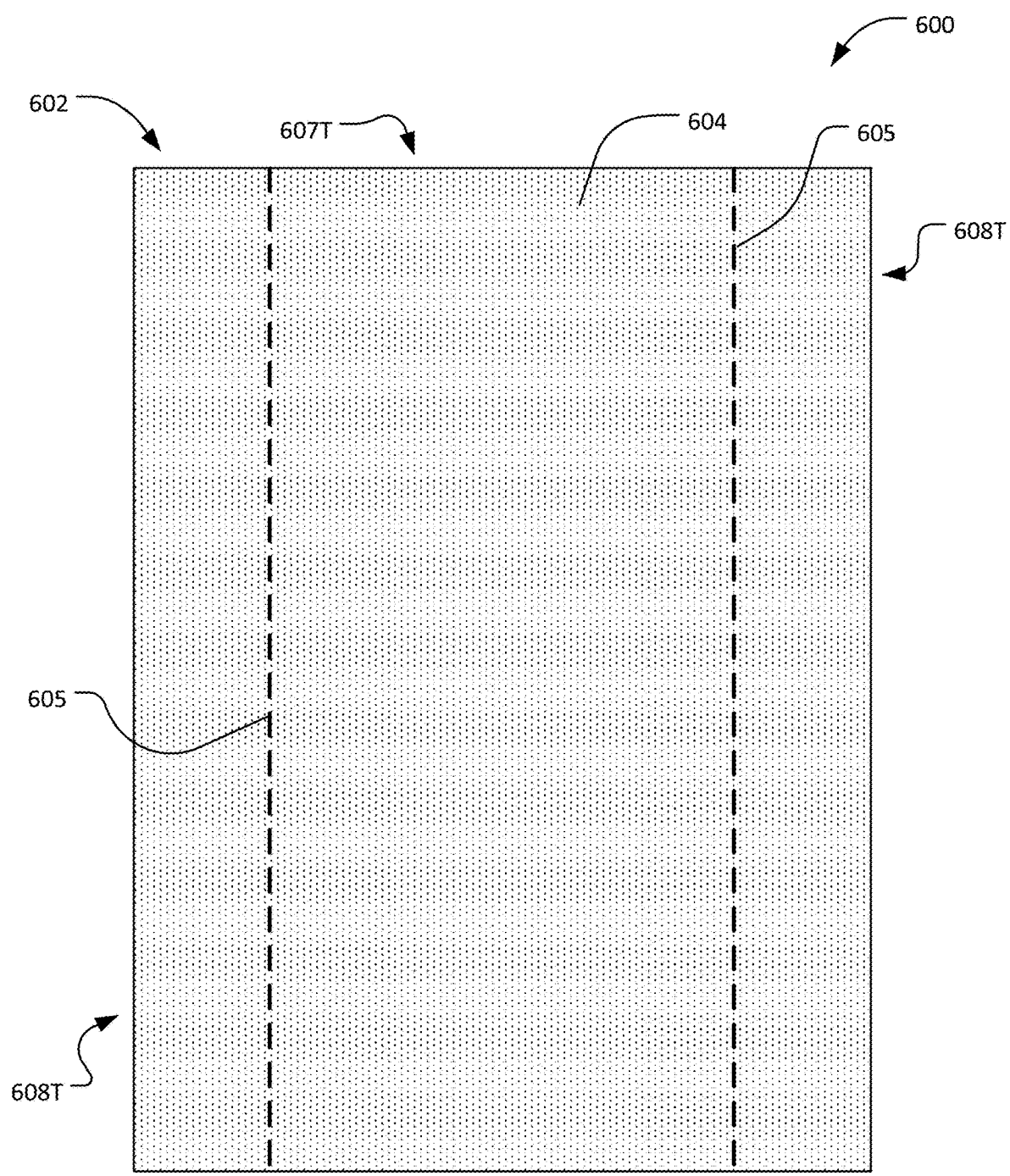
FIG. 8B is a top view of the label employing the displaceable liner of FIG. 8A.
Figure 8C:
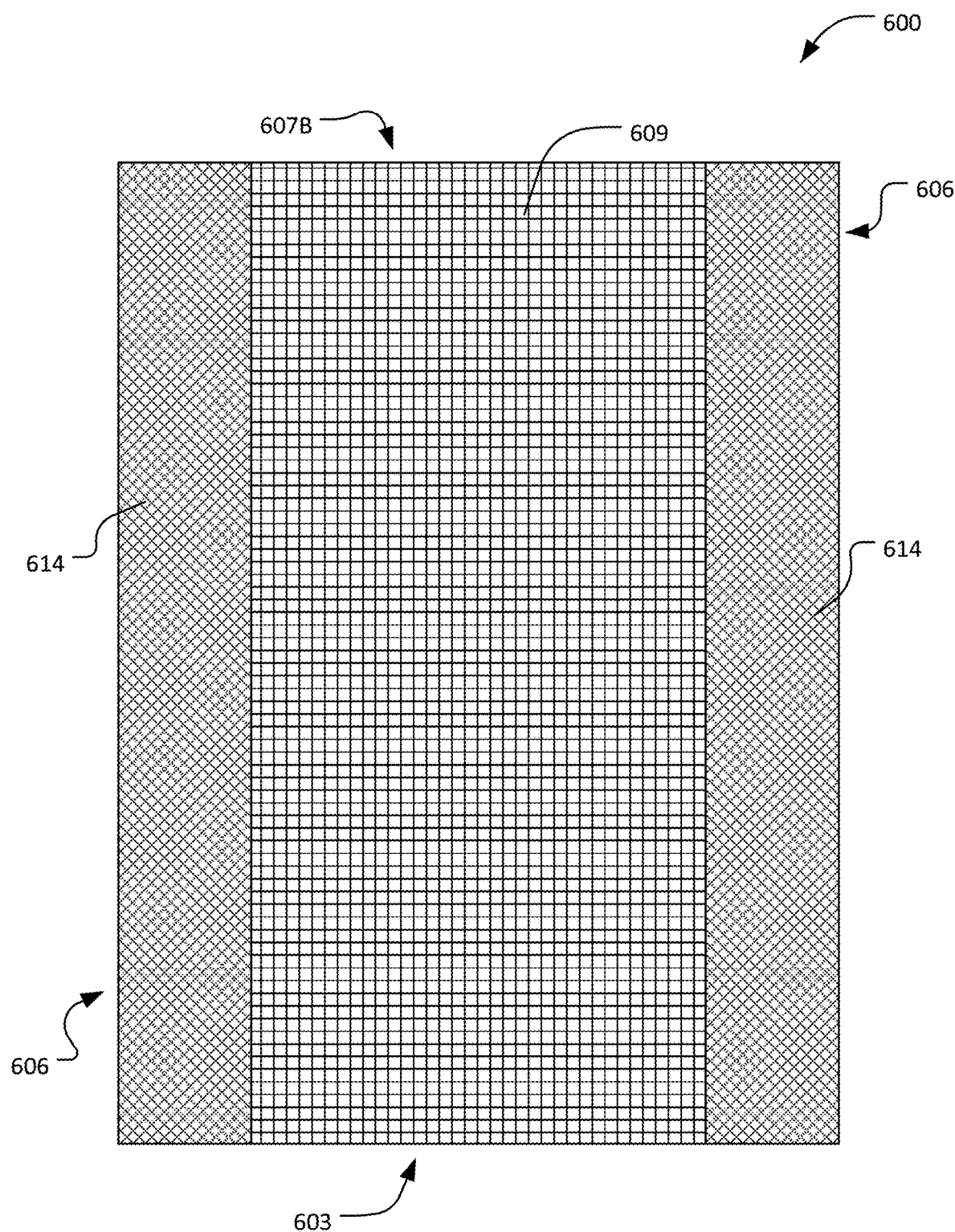
FIG. 8C is a bottom view of the label employing the displaceable liner of FIG. 8A.
Figure 8D:
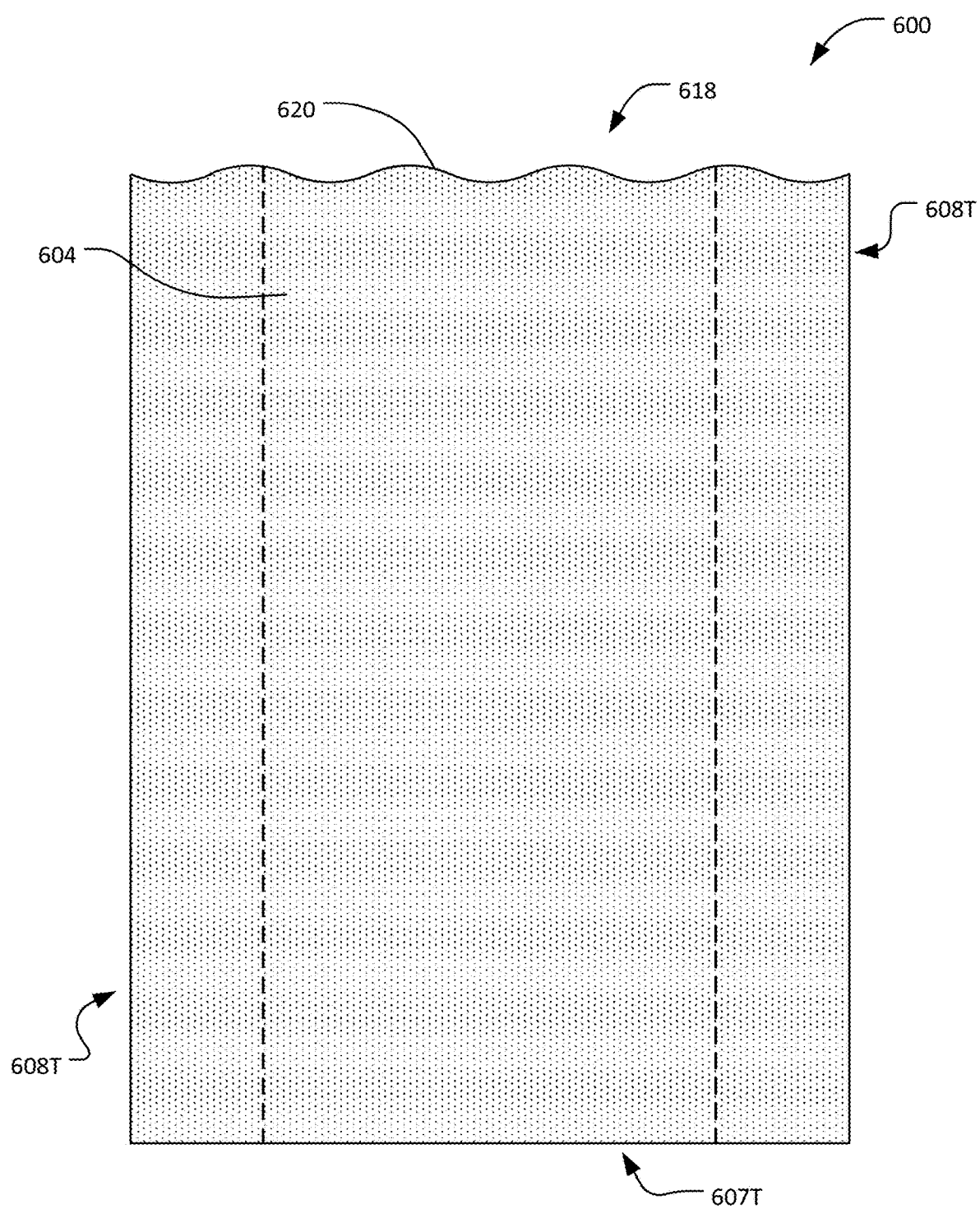
FIG. 8D is a top view of a non-linear edge of the label employing the displaceable liner of FIG. 8A.
Figure 9:
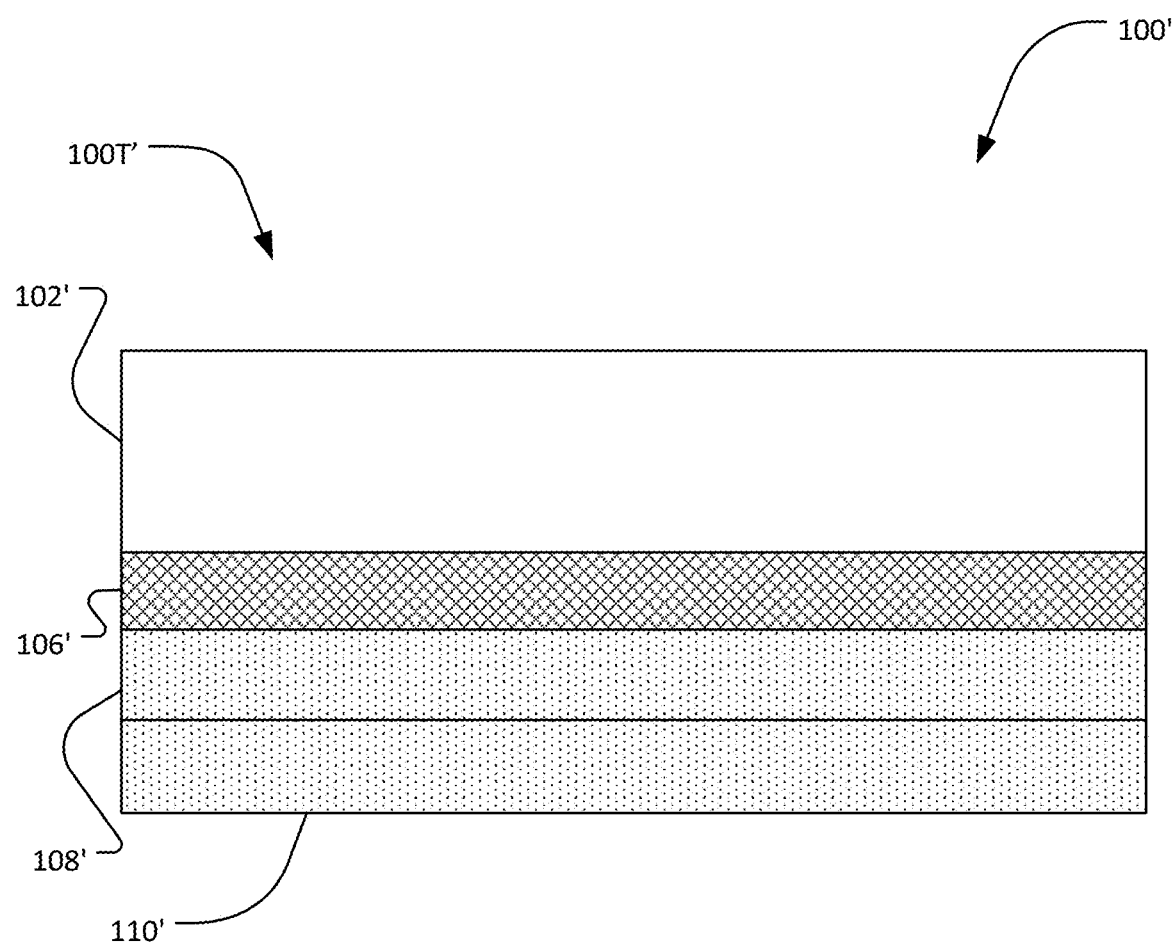
FIG. 9 is a schematic representation of tape employing a displaceable liner for adhering to a substrate, according to still another embodiment of the disclosure.
Figure 10:
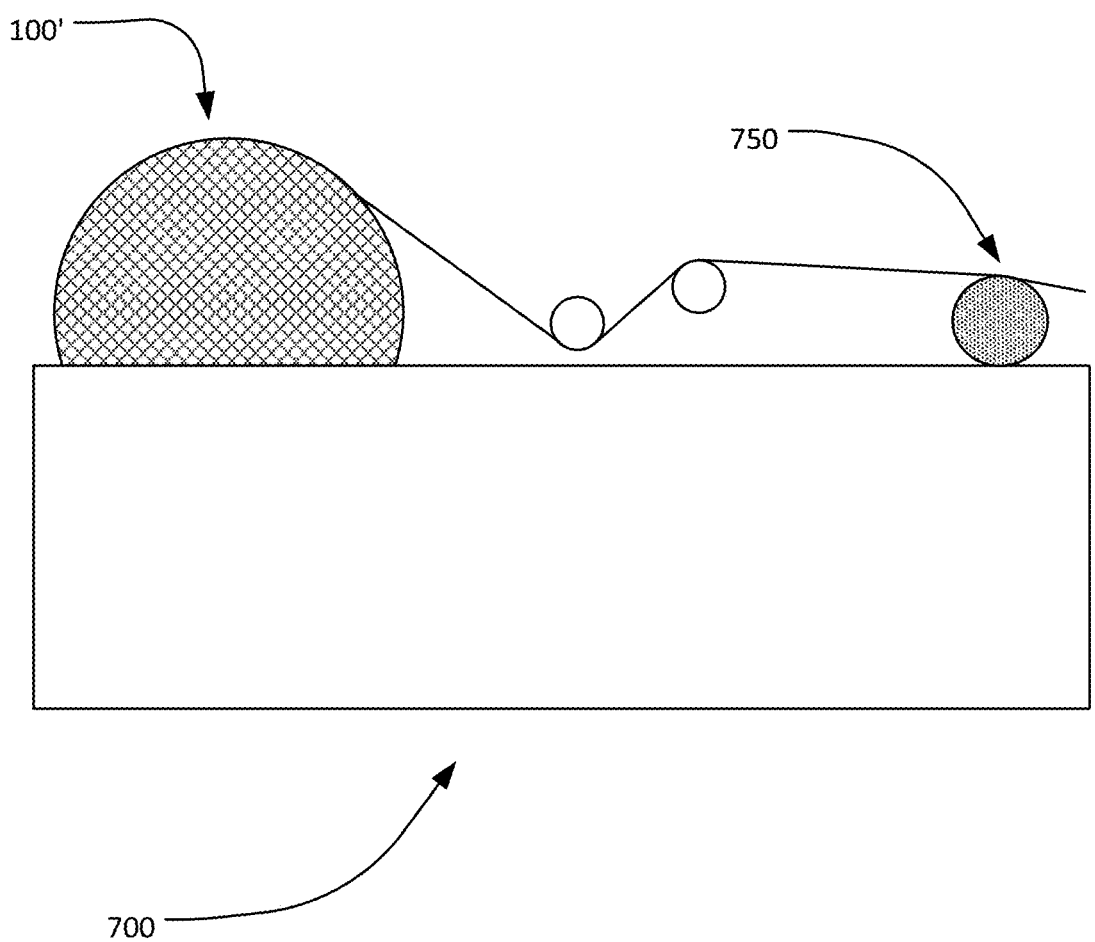
FIG. 10 is a side view of a tape dispenser employing the tape with the displaceable liner of FIG. 9

The displaceable liner of the present disclosure is first illustrated herein with a simplex (i.e., single ply) label 100 (FIGS. 2-, 3A-3B, and 4A-4B). A method of making and using this simplex label 100 is then discussed (FIG. 5). Use of the displaceable liner is subsequently discussed in connection with another simplex label 300 printable on both sides (FIGS. 6A-6B). Workings of the displaceable liner are then detailed in connection with a duplex label 400 (FIGS. 7A-7C) and a duplex label 600 (FIGS. 8A-8D). Next, use of the displaceable liner with a tape product 100' is illustrated (FIGS. 9-10). Thereafter, systems (e.g., system 1000) and methods of fully or partially automating the process of using labels having the displaceable liner of the present disclosure are discussed (FIGS. 11-17, 17A, 18-20). The artisan will understand that the label products, tape products, labeling systems and methods, et cetera, disclosed herein are exemplary and are not intended to be independently limiting.

Focus is directed now to FIG. 2, which shows an example embodiment 100 of a simplex label (i.e., a label where indicia is printed on one side of the label, e.g., a single ply label) having a displaceable liner 110, according to the teachings of the present disclosure. The illustrated label 100 has a top side 100T and a bottom side 100B. As discussed herein, indicia may be printed on the top side 100T and the label 100 may be adhered to a substrate 50 (e.g., a cardboard box, a piece of paper, a plastic jug, an envelope, a porous surface, a non-porous surface, and/or any other suitable surface) at the bottom side 100B. The indicia may be printed media (e.g., text, icons, pictures, graphics, colors, etc.) and may be configured to convey information to a user (e.g., personalized information, generalized information, et cetera).

In more detail, the label 100 may have a face stock 102, which may have an upper side 102U and a lower side 102L. The face stock 102 may comprise a solitary ply 102, made, for example, of paper. This face stock 102 may also be referred to herein as a face ply to indicate that the face stock comprises a solitary ply. Alternately, in other embodiments, the face stock 102 may contain more than one ply. In other embodiments still, the face stock 102 may comprise a film (e.g., a clear plastic film) or other printable substrate.

The face ply 102, at its upper side 102U, may be provided with a topcoat 104. The topcoat 104, akin to the topcoat 16 of the prior art label 10, may be configured for the reception of printed (e.g., black and/or colored) indicia (e.g., content configured to be consumed by consumers). The topcoat 16 may be, e.g., a direct thermal or other printable coating. In embodiments, the face ply 102 may be inherently printable and not require a separate printable coating to be disposed thereon.

The label 100 may have a hydrophilic layer 106 located on a face ply lower side 102L. The hydrophilic layer 106 may have hydrophilic or semi-hydrophilic properties (e.g., a substantial affinity for liquid absorption). The hydrophilic layer 106 may additionally provide structural support to the label 100, such as by preventing deformation and/or disintegration of the label 100 when the face ply 102 or the displaceable liner 110 absorbs moisture (e.g., when they become saturated with a liquid). The hydrophilic layer 106 may be, for example, an inkjet coating. In another embodiment, soft feel coating or other such coating may be employed. In some embodiments, the hydrophilic layer 106 may be a combination of two or more hydrophilic coatings; alternately, the hydrophilic coating 106 may be a combination of substances that, when mixed together, have a tendency to absorb water. While the hydrophilic coating 106 may cover the entire face ply lower side 102L, in embodiments, the hydrophilic coating 106 may instead be arranged in a pattern. The pattern may be any pattern (e.g., a checkerboard pattern, a dot pattern, lines, stripes, random, et cetera), and may but need not be symmetrical. The pattern may include openings (i.e., areas that are devoid of the hydrophilic coating 106).

In certain applications, the face ply 102 may inherently include the desirable properties of a hydrophilic layer 106 (e.g., the face ply 102 may have the ability to draw in water, may have sufficient structural integrity, et cetera) such that use of a separate hydrophilic coating 106 may be unnecessary. For instance, where the face ply 102 is relatively thick, it may by itself emulate a relatively thin face ply 102 that is layered with a hydrophilic coating 106.

An adhesive layer 108 may be located on a hydrophilic layer lower side 106L, and may be covered (e.g., wholly, partially) by the displaceable liner 110 (i.e., the displaceable liner 110 may initially be located on an adhesive layer lower side 108L). The adhesive layer 108 may be any suitable adhesive now known or subsequently developed, such as a pressure sensitive adhesive. In an embodiment, the adhesive 108 may be a hot-melt adhesive. In use, when the displaceable liner 110 is displaced from the adhesive 108 to expose the adhesive 108 as discussed herein, the adhesive layer 108 may be used to secure the face ply 102 to the substrate 50. Upon displacement of the displaceable liner 110, the exposed adhesive 108 may contact and bond with the substrate 50 to cause the face ply 102 to become secured to the substrate 50; the displaceable liner 110, conversely, may not contact the substrate 50 and therefore may not interfere with the bond between the substrate 50 and the label 100.

In embodiments, it may be important to arrange the adhesive layer 108 in a pattern 108P (see FIG. 3A) having areas comprising adhesive and areas devoid of adhesive (or at least having areas having a substantially lower concentration of adhesive as compared to other areas of the adhesive pattern 108P). In these embodiments, the adhesive layer 108 may cover only portions of the hydrophilic layer 106 (i.e., the hydrophilic layer 106 may be uncovered by adhesive 108 in portions of the adhesive pattern 108P devoid of the adhesive). The adhesive pattern 108P may be any pattern (e.g., a checkerboard pattern, a dot pattern, lines, stripes, random, etc.), and may but need not be symmetrical. As discussed herein, the adhesive layer pattern 108P may facilitate the workings of the displaceable liner 110 and may, in some embodiments, be a requirement therefor to ensure a secure bond between the label 100 and the substrate 50. The displaceable liner 110 may initially cover the adhesive 108 and ensure the adhesive 108 does not undesirably contact a surface (e.g., the printer, the conveyer belt, et cetera) or debris to cause the label 100 to inadvertently bond to such surfaces or debris; upon activation, the displaceable liner 110 may get displaced as discussed herein and consequently expose the adhesive 108 to allow for securement of the label 100 to a substrate 50. Thus, the displaceable liner 110 may selectively shield the adhesive 108, in effect functioning like a traditional liner, until such time that exposing the adhesive 108 to bond the label 100 with the substrate 50 is desired.

The adhesive pattern 108P may include openings (i.e., areas that are devoid of the adhesive layer 108). For example, in embodiments, the adhesive layer pattern 108P may have a one or more of each of recesses 108R and crests 108C, as shown in FIGS. 3 through 4, which are used to illustrate example operation of displaceable liner 110 in view of the adhesive 108. The adhesive pattern crests 108C may be areas of the adhesive pattern 108P on the label 100 (e.g., at the lower side 106L of the hydrophilic layer) where the adhesive 108 is present, and the adhesive pattern recesses 108R may be areas of the adhesive pattern 108P devoid of the adhesive 108. Each adhesive crest 108C may have a height 108H (see FIG. 4A), which may (though need not be) substantially the same as the height of adjacent adhesive crests 108C. This height 108C may correspond to the thickness of the adhesive layer 108. Further, each adhesive crest 108C may be spaced apart (e.g., laterally spaced apart) from an adjoining adhesive crest 108C by a distance 109W, which distance may be equal to a width of an adhesive pattern recess 108R. Each adhesive recess 108R, encapsulated on one or more sides by adjoining crests 108C, may form a "pocket" (or a "liner receiving region") for receiving the displaceable liner 110 once the displaceable liner 110 is activated by a fluid. Reception of the displaceable liner 110 by the pockets 108R may be facilitated by the hydrophilic coating 106 underneath the adhesive layer recesses 108R, which coating 106 may facilitate the displacement of the displaceable liner 110 by drawing in the displaceable liner 110 into the pockets 108R upon activation. The adhesive pattern 108P may be arranged in any suitable manner such that the pockets 108R thereof are configured to receive the displaceable liner 110 upon activation. In some embodiments, the recesses 108R may contain some adhesive 108 but a height of the adhesive therein may be less than the height 108H of the adhesive crests 108C, thereby allowing for the displaceable liner 110 to be received within the recesses 108R.

In more detail, the adhesive crests 108C may define the boundaries of the adhesive recesses 108R. For example, the adhesive crests 108C may be arranged along the label 100 in a plurality of lines or crisscrossed lines (i.e., a grid pattern), and a plurality of adhesive recesses 108R may be located in the spaces between these lines of adhesive. The adhesive crests 108C may each have any suitable width, height, and spacing, so long as the displaceable liner 110 situated thereon can cleanly transition from the adhesive crests 108C to the pockets 108R upon activation.

Figure 3A:
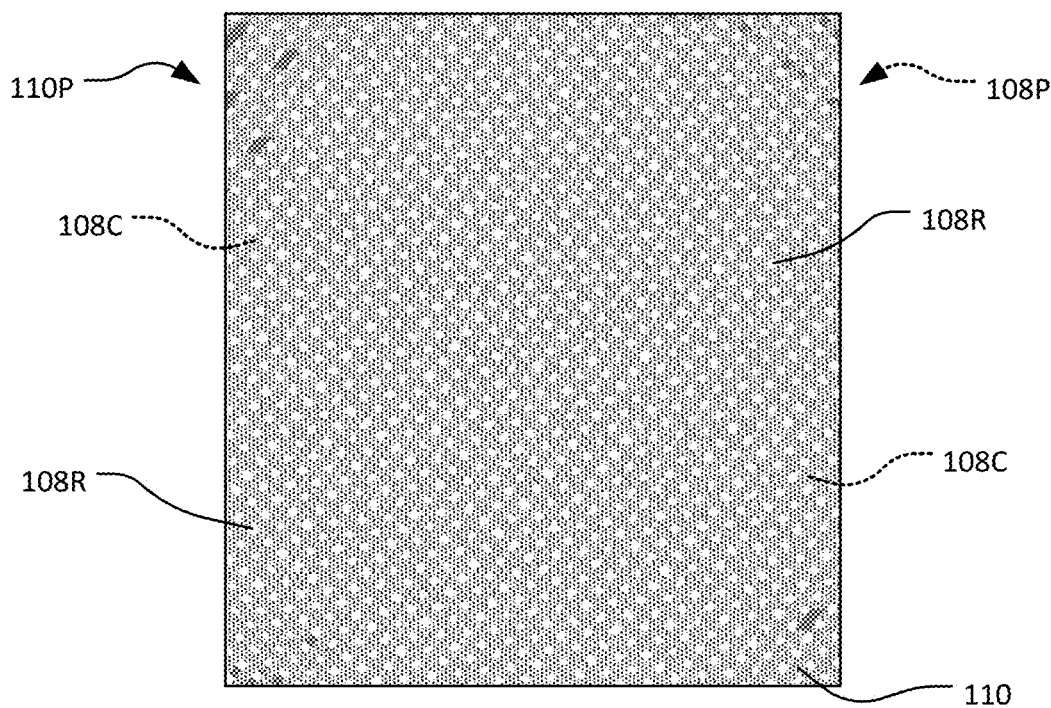
FIG. 3A is a bottom view of the label of FIG. 2 with the displaceable liner thereof in an inert state, according to an embodiment of the disclosure.
Figure 3B:
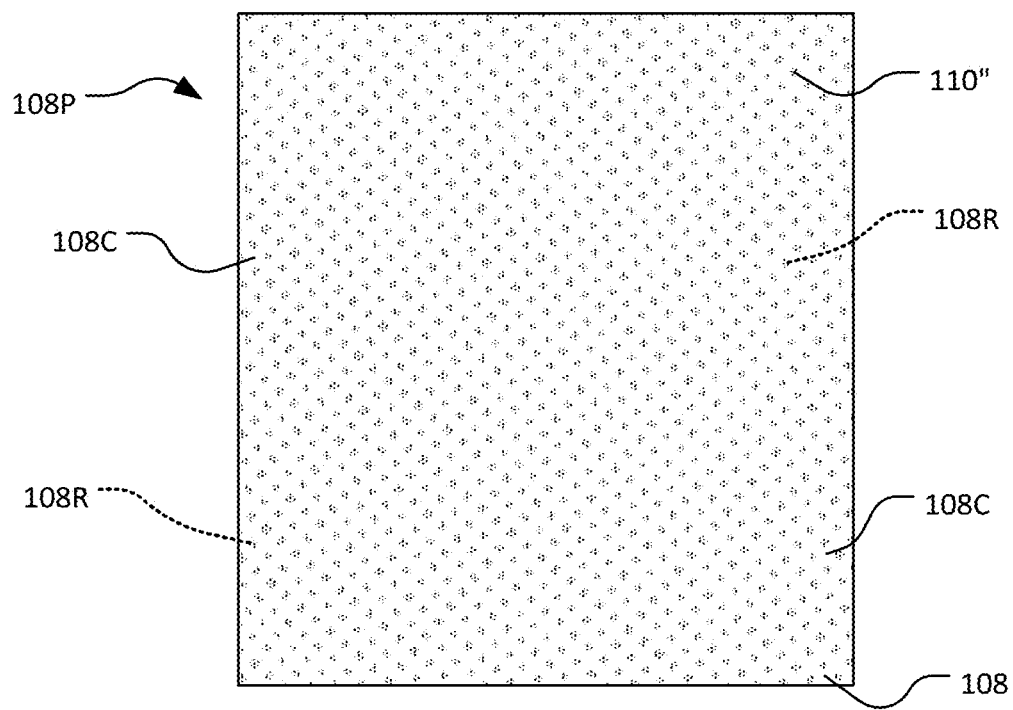
FIG. 3B is a bottom view of the label of FIG. 2 with the displaceable liner thereof in an activated state.
Figure 4A:
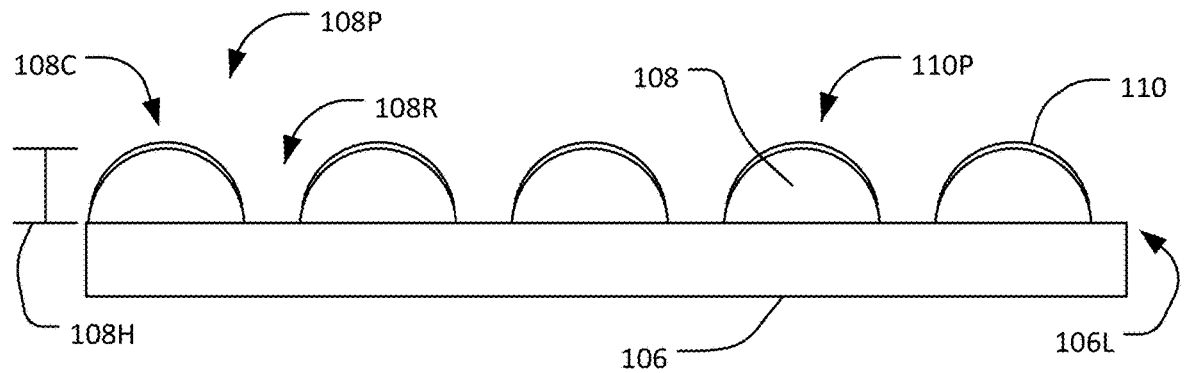
FIG. 4A is a schematic cross-sectional view of the displaceable liner in an inert state, in an embodiment.

FIG. 3A shows a bottom view of an example label 100. Prior to activation, the displaceable liner 110 may be disposed on the crests 108C of the adhesive pattern 108P. The crests 108C in FIG. 3A are thus labeled with a dashed line to indicate that this portion of the adhesive pattern 108P lies beneath the displaceable liner 110. Once the displaceable liner 110 is activated (e.g., by water), the displaceable liner 110 may be displaced from above the crests 108P to within the recesses 108R or pockets, as shown in FIG. 3B. The crests 108C in FIG. 3B are demarcated with a solid line to indicate the displaceable liner 110 has moved from the crests 108C into the pockets 108R, thereby exposing the adhesive crests 108C.

Figure 4B:
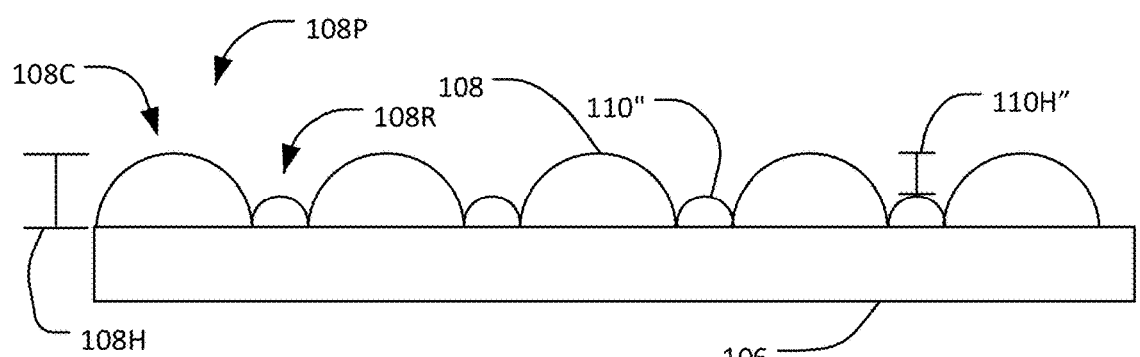
FIG. 4B is a schematic cross-sectional view of the displaceable liner of FIG. 4A, in an activated state.

To illustrate further, FIG. 4A shows that the displace liner 110 may overlie the adhesive crests 108C before the liner 110 is activated. Prior to activation, the adhesive recesses 108R, which are devoid of adhesive 108, may also be devoid of the displaceable liner 110. Once activated with water or another fluid, the displaceable liner 110 may transition to within the recesses 108R and expose the crests 108C of the adhesive layer 108, as shown in FIG. 4B. The exposed adhesive crests 108C may now be usable to secure the label 100 to the substrate 50. In embodiments, the adhesive crests 108C may form a bond with the substrate 50 whereas the displaceable liner 110 within the pockets 108R may not contact the substrate 50 because of the appreciably greater height 108H of the crests 108C relative to a height 110H of the displaceable liner 110 within the pockets 108R. To this end, a thickness of the adhesive 108 layer may be substantially greater than a thickness of the displaceable liner 110. If an undesirably thick layer of the displaceable liner 110 is disposed on the crests 108C, upon activation the displaceable liner 110 may not fit within the pockets 108R and thus lead to insufficient exposure of the adhesive 108.

While FIGS. 3A and 3B show a lined grid pattern of adhesive crests 108C and recesses 108R, other suitable adhesive patterns 108P are contemplated and are within the scope of the disclosure (e.g., concentric shapes, checkered, random, et cetera). Further, while FIGS. 4A and 4B show adhesive crests 108C that are generally rounded, other suitable adhesive layer 108 shapes are contemplated and are within the scope of this disclosure (e.g., rectangular, triangular, random, et cetera). In embodiments, an important consideration may include ensuring that the pattern 108P has suitably sized pockets 108R or regions to receive the specific type and amount of displaceable liner 110 being used upon activation.

As noted, the displaceable liner 110, before it is activated, may shield the adhesive 108 and preclude the adhesive layer 108 from coming into contact with—and thus adhering to—undesirable surfaces or debris. The displaceable liner 110 may be displaced, i.e., may be made to travel from its original location vertically adjacent the crests 108C into the recesses 108R to expose the adhesive crests 108C (i.e., transition from being vertically adjacent the crests 108C be being laterally adjacent the crests 108C) by applying a fluid to the displaceable liner 110. In some embodiments, at least a part of the activated displaceable liner 110 may be dissolved into the label 100 (e.g., into the hydrophilic layer 106 thereof). While not required, depending on the configuration of the displaceable liner 110 and the substrate, in some embodiments a part of the displaceable liner 110 may contact the substrate 50 and be dissolved into the substrate 50. Such contact between the displaceable liner 110 and the substrate 50, however, is not needed, when bonding the label 100 to the substrate 50.

In effect, the displaceable liner 110 may be a liner that is selectively changeable between a first state and a second state. The first state may be a generally inert state where the displaceable liner 110 acts in a similar manner to the conventional liner, and precludes the adhesion of the label 100 to surfaces (e.g., undesirable surfaces) until the label 100 is ready to be adhered to the substrate 50. The second state may be an "actuated" state. The displaceable liner 110 may be actuated by bringing the displaceable liner 110 in contact with a fluid (e.g., water), which fluid may, for example, be provided on the substrate 50. When the displaceable liner 110 is brought into contact with the fluid on the substrate 50, the displaceable liner 110 may actuate and dispel, or otherwise be displaced from its original location.

Broadly, the phrase "displaceable liner", as used herein, refers to a cover or coating for covering a first composition, which cover is specifically adapted to begin to displace or otherwise dispel when the cover is brought into contact with a second composition. Upon such contact, the cover may be displaced such that the first composition is usable for contacting a third composition. In embodiments, the first composition may be the adhesive layer 108, the second composition may be water (e.g., water vapor, liquid water, et cetera), and the third composition may be the substrate 50. That is, in embodiments, the displaceable liner 110 may be a composition that: (a) covers the adhesive layer 108 so as to preclude the adhesive layer lower side 108L from undesirably sticking to another object or surface (the inert state); and (b) is configured to displace and/or dispel when the displaceable liner is brought into contact with a fluid (the actuated or activated state). The term "displaceable liner", as used herein, specifically excludes a traditional liner ply or plies, such as paper coated at least in part with silicone or other release material, a film, et cetera. The term "displace", as used herein, connotes that the displaceable liner coating, once wetted, is dispelled, dissolved, or otherwise moves from its original location to another location.

In embodiments, the inactivated displaceable liner 110 may not have any (or any appreciable) adhesion. For example, while the displaceable liner 110 is covering the adhesive layer lower side 108L prior to displacement, the displaceable liner 110 may not undesirably stick to objects that it touches. The displaceable liner 110, even upon activation, may not form a bond with a nonporous substrate in contact therewith. The activated displaceable liner 110 may in embodiments be capable of forming a bond with certain porous substrates upon contact, however, this bond may be weak relative to the bond formed by the adhesive 108 (e.g., the hotmelt). Further, if the objective were to cause the dissolvable liner 110 to contact the substrate 50, the amount of dissolvable liner 110 on the label 100 may need to be increased, which may then detract from the transition thereof into the pockets 108R and unduly interfere with the bond to be formed by the adhesive layer 108. In view of these considerations, in embodiments, only the adhesive 108 may be used to bond the label 100 to the substrate 50 and the dissolvable liner 110 may be used not for any bonding capabilities but to move out of the way of the adhesive 108 when desired to allow the adhesive 108 to create the bond.

In embodiments, the constituents of the displaceable liner 110 may include an enabler 222, a facilitator 224, and a stabilizer 226. In some embodiments, the displaceable liner 110 may also include a slip agent 228.

The enabler 222 may be the base or main ingredient of the displaceable liner 110. In embodiments, the enabler 222 may comprise a remoistenable adhesive or other similar material. The artisan will understand from the discussion herein that the displaceable liner 110, once composed, behaves disparately from the enabler 222 and from any of its other ingredients separately.

The facilitator 224 may be an ingredient that facilitates displacement of the displaceable liner 110 into the pockets 108R upon contact with a fluid (e.g., water). The facilitator 224 may do so by desirably impacting the properties (e.g., the viscosity) of the enabler 222. In an embodiment, the facilitator 224 may be activated coconut carbon water 224A, which, as is known, may be devoid of many of the impurities typically found in tap water. Applicant's experimentation has shown that use of activated coconut carbon water as the facilitator 224 as opposed to tap water allows the displaceable liner 110 to be activated by a larger group of fluids.

The stabilizer 226 may serve, among other things, to increase the stability and the temperature resistance of the enabler 222. The stabilizer 226 may also serve as a blocking agent, such as by precluding the enabler 222 from being undesirably activated in humid ambient conditions. In some embodiments, the stabilizer 226 may influence other properties of the displaceable liner 110, such as the surface tension of the displaceable liner 100.

The slip agent 28 may be, for example, a release material (e.g., safflower oil 228A, silicone 228B. etc.) that increases the temperature resistance properties and/or the non-adhesion properties of the displaceable liner 110. The slip agent 228, which may make up about 0.25% by weight the displaceable liner 110 mixture, may facilitate the use of certain printing methods with the label 100, such as laser printing or direct thermal printing. For example, the slip agent 228 may ensure that the adhesive crests 108C do not ooze out into the recesses 108R because of the high temperatures to which the label 100 is subjected in laser printers.

In embodiments, the displaceable liner 110 may include different (e.g., alternate, additional) ingredients that may influence the properties and/or the applicability of the displaceable liner 110. For example, embodiments of the displaceable liner 110 may incorporate various ingredients whose properties are more compatible with certain types of substrates 50 (as demonstrated below in tables 1 and 2). As another example, where it is desired to give the displaceable liner 110 a hue (e.g., an off-white—or any other—hue such that the displaceable liner 110 resembles a traditional paper liner), a colored pigment may be included to impart such a hue to the displaceable liner 110.

Table 1 below shows the constituents 202 of a displaceable liner 110 in an embodiment 110A. This embodiment 110A may include a mixture of non-toxic remoistenable adhesive 222A, activated carbon coconut water 224A ("ACC water"), precipitated calcium carbonate (PCC) 226A, and safflower oil 228A. The label 100 (specifically the bottom side 100B thereof) may then be coated with this mixture to preclude the face ply 102 from undesirably adhering to objects and to allow the label to be adhered to the substrate 50 when desired.

TABLE 1

| | DISPLACEABLE LINER 110A | | |
|---|---|---|---|
| No. | Ingredient 202 | Quantity range 204 | Preferred quantity 206 |
| 1 | Enabler 222: Non-toxic remoistenable adhesive 222A | 1 lbs. to 5 lbs. | 3 lbs. |
| 2 | Facilitator 224: ACC water 224A | 0.5 lbs. to 1.5 lbs. | 1 lbs. |
| 3 | Stabilizer 226: Precipitated calcium carbonate 226A | 0.09 lbs. to 0.27 lbs. | 0.18 lbs. |
| 4 | Slip Agent 228: Safflower oil 228A | 0.004 lbs. to 0.017 lbs. | 0.0105 lbs. |

Applicant's experiments have shown that this combination of ingredients 202 may enable the displaceable liner 110A to readily be displaced from the adhesive crests 108C to the adhesive recesses 108R once activated by a fluid (e.g., water) to expose the adhesive crests 108C. By retreating within the label 100 (e.g., the recesses 108R therein), the activated displaceable liner 110A may be precluded from interfering with the bond between the adhesive 108 and the substrate 50. If a substantial part of the displaceable liner 110 did not get displaced from the adhesive crests 108C to the pockets 108R, this liner 110 would continue to block the adhesive crests 108C at least in part and thus preclude the crests 108C from serving their intended purpose—to securely adhere the label 100 to the substrate 50. By being displaced, the displaceable liner 110 may allow the label 100 to be adhered to any object that bonds with the adhesive 108C (e.g., with a hot-melt adhesive). In embodiments, the transition of the displaceable liner 110 from the adhesive crests 108C to the pockets 108R may generally be in toto such that the entire adhesive layer 108 (as opposed to only portions thereof) may be exposed. This may allow the label 100 to be secured to substrates 50 that require substantial amounts of adhesive for bonding the label thereto (e.g., plastics, high-density polyethylene, et cetera). Of course, the label 100 may also be secured to conventional substrates 50 (e.g., cardboard, paper, et cetera).

As noted, the displaceable liner 110, once composed, behaves disparately from the enabler 222 and from any of its other ingredients separately. For instance, the enabler 222 by itself could not be used in place of the displaceable liner 110 because the enabler 222 would cause the label 100 to undesirably curl, and would cause the label 100 to unduly adhere to surfaces (e.g., hands, printing equipment, et cetera). Further, Applicant's experiments have shown the enabler 222 by itself does not adequately traverse to the pockets 108R upon the application of a fluid (e.g., water) to expose the adhesive 108. And further yet, the amount of water required to cause the enabler 222 (e.g., remoistenable adhesive) to be used to adhere the label 100 to the substrate 50 is orders of magnitude (specifically, 10-20 times) the amount of water it takes for the displaceable liner 110 to be displaced to give way to the underlying adhesive 108. In the same vein, the displaceable liner 110 does not behave as one would expect the facilitator 224, the stabilizer 224, or the slip agent 228 to behave, either individually or combined together (with or without the enabler 222). In this regard, the properties of the displaceable liner 110 are unexpected and surprisingly beneficial.

The quantity ranges 204 and the preferred quantities 206 of the various ingredients 202 listed above are merely exemplary and are not intended to be independently limiting. For example, in embodiments, more activated coconut carbon filtered water 224A may be added to reduce the viscosity of the displaceable liner coating 110, more PCC 226A may be added to further enhance the stability of the enabler 222, et cetera. Further, in embodiments, the preferred quantities 206 of the various ingredients 202 listed above may be proportionally reduced or increased for smaller or larger applications, respectively. The preferred quantities 206 listed above will yield a volume of about 4.1905 lbs. of the displaceable liner coating 110A, which may be used to coat many thousands of labels 100 to cover the face ply lower sides 102L thereof.

Table 2 below shows the constituents 212 of another displaceable liner 110 in an embodiment 110B. This embodiment 110B may include a mixture of non-toxic remoistenable adhesive 222B, activated carbon coconut water 224B ("ACC water"), gypsum 226B, and silicone 228B. The label 100 (specifically the bottom side 100B thereof) may then be coated with this mixture to preclude the face ply 102 from undesirably adhering to objects and to allow the label to be adhered to the substrate 50 when desired.

TABLE 2

DISPLACEABLE LINER 110B

| No. | Ingredient 212 | Quantity range 214 | Preferred quantity 216 |
|---|---|---|---|
| 1 | Enabler 222: Non-toxic remoistenable adhesive 222A | 2 lbs. to 6 lbs. | 4 lbs. |
| 2 | Facilitator 224: ACC water 224A | 0.125 lbs. to 0.375 lbs. | .25 lbs. |
| 3 | Stabilizer 226: Gypsum 226B | 1-50 heaping teaspoons (about 0.05 lbs. to 2.8 lbs.) | 21 heaping teaspoons (about 1.2 lbs.) |
| 4 | Slip Agent 228: Silicone 228B | 0.0055 lbs. to 0.023 lbs. | 0.014 lbs. |

The displaceable liner 110B may operate similarly to the displaceable liner 110A (e.g., by precluding undue contact between the adhesive 108 and substrates until activated). A key difference between the displaceable liner 110B and the displaceable liner 110A may be that the displaceable liner 110B may require a porous substrate 50, such as a cardboard box or other conventional substrate, which serves to absorb at least a portion of the displaceable liner 110. Thus, with the displaceable liner 110B, the transition of the displaceable liner 110B into the pockets 108R together with the dissolving of the displaceable liner 110B by the porous substrate 50 may collectively allow for the adhesive 108 to be exposed and work to securely adhere the label 100 to the substrate 50. Unlike the displaceable liner 110A, the displaceable liner 110B may not function effectively with nonporous substrates (such as plastic sheets, milk jugs, pill bottles, et cetera). In embodiments, the label 100 may have its components modified to compensate for such a displaceable liner 110B, such as by including a thicker hydrophilic layer 106 that more readily absorbs the activated displaceable liner 110B.

The displaceable liner 110B, like the displaceable liner 110A, may comprise an enabler 222, a facilitator 224, a stabilizer 226, and a slip agent 228. In embodiments, the enabler 222 may be the non-toxic remoistenable adhesive 222A, i.e., the same enabler 222 that is used in the displaceable liner 110B. In an embodiment, the facilitator 224 of the displaceable liner 110B may be the same as the facilitator 224A, e.g., ACC water. In other embodiments, a different enabler 222 and/or facilitator 224 may be used in the different displaceable liners.

The stabilizer 226 used in the displaceable liner 110A and 110B may be different. For example, in an embodiment, instead of precipitated calcium carbonate, the displaceable liner 110B may employ gypsum 226B as the stabilizer 226. Where a slip agent 228 is used, the displaceable liner 110B may use the same slip agent or a different slip agent relative to the displaceable liner 110A (e.g., silicone).

Like the displaceable liner 110B, the quantity ranges 214 and the preferred quantities 216 of the various ingredients 212 listed above are merely exemplary and are not intended to be independently limiting. For example, in embodiments, more activated coconut carbon filtered water 224A may be added to reduce the viscosity of the displaceable liner coating 110, more gypsum 226B may be added to further enhance the stability of the enabler 222, et cetera. Further, in embodiments, the preferred quantities 216 of the various ingredients 212 listed above may be proportionally reduced or increased for smaller or larger applications, respectively.

The artisan would understand from the examples above that there may be a variety of enablers 222, facilitators 224, stabilizers 226, and slip agents 228 that may be used in embodiments of the displaceable liner 110, and that the composition of the displaceable liner 110 may be varied in line with a particular application. For instance, precipitated calcium carbonate may be used as the stabilizer 226 for applications involving any type of substrate (including non-porous substrates) as the dissolvable liner 110A comprising precipitated calcium carbonate 226A may not need to be dissolved into a substrate 50 to allow the label 100 to adhere to the substrate 50 via the exposed adhesive 108. Alternately, gypsum 226B may be used as the stabilizer 226 in applications where the substrate 50 is porous and capable of absorbing the dissolvable liner 110. As noted, precipitated calcium carbonate 226A may also be used as the stabilizer 226 when the substrate 50 is porous; however, dissolving of this dissolvable liner 110A by the substrate 50 may not be a prerequisite, and indeed, may deter from the secure adhesion of the label 100 to the porous substrate 50.

The dissolvable liner 110A and 110B may have other differences that may make them uniquely suitable for particular applications. For example, the hot melt 108, once exposed by the activated dissolvable liner 110A, may be usable to secure the label 100 to the substrate 50 after an extended wait period (e.g., a day). The hot melt 108 exposed by the activated dissolvable liner 110B, conversely, may be repositionable but may need to be applied to a substrate within minutes upon wetting.

In some embodiments, one or more of the ingredients may be omitted. For example, the slip agent 228 may be omitted in certain low temperature applications. Thus, in embodiments, one or more of a suitable enabler 222, facilitator 224, stabilizer 226, and/or slip agent 228 may be used in the displaceable liner 110 to impart a desired property.

In an embodiment, the enabler 222A may have a vapor pressure at 20° C. of about 23.4 hPa, a density at 20° C. of about 1.08 g/cm$^3$, a pH value at 20° C. of 4.0-6.0, a flash point of over 232° C., and a VOC content of 1.6 g/l/0.01 lb/gl. For example, in an embodiment, the remoistenable adhesive 222A may be the PriscoBond 121-H remoistenable adhesive commercially available by Prisco®. Alternately or additionally, in other embodiments, the remoistenable adhesive may be one or more of the remoistenable adhesives disclosed in U.S. Pat. No. 3,574,153 to Sirota, U.S. Pat. No. 4,575,525 to Wancome et al., U.S. Pat. No. 4,623,688 to Flanagan, U.S. Pat. No. 5,296,535 to Fazioli et al., each of which are incorporated by reference herein. Other remoistenable adhesives known to the artisan and/or subsequently developed may likewise be employed. Applicant's experimentation confirms that off-the-shelf remoistenable adhesives 222 disclosed herein, such as the PriscoBond 121-H product, cannot suitably be used as adhesive covers for labels until other ingredients are combined therewith.

The displaceable liner 110 may temporarily cover the adhesive layer 108 while the topcoat 104 is exposed for printing. As such, the label 100 may be printed using any suitable technology now known or subsequently developed (such as a direct thermal printer, a thermal transfer printer, a laser printer, an inkjet printer, et cetera). The displaceable liner 110 in its inert state may preclude adhesion between the label 100 and objects with which the label 100 comes into contact with (e.g., a printer roller, another label, small debris, a table or other surface) before it is time to adhere the label 100 to the substrate 50. The displaceable liner 110 may be heat-resistant and may be able to readily withstand the relatively high temperatures encountered by labels in printers (e.g., laser printers). Further, the displaceable liner 110—which may comprise a non-toxic remoistenable adhesive as a constituent thereof—may as a whole be a non-sticky substance when dry (i.e., when in the inert state). Thus, the displaceable liner 110 itself may not undesirably stick to a surface before the label 100 is ready to be applied to the substrate 50.

In embodiments, the displaceable liner 110 and the adhesive layer 108 on the label, prior to activation, may be in registry. For example, where the adhesive layer 108 is disposed in the pattern 108P, the displaceable liner 110 may be disposed on the pattern 108P such that the two patterns are in registry. Such may be effectuated, e.g., by using a roller having cells corresponding to the adhesive pattern 108P to dispose the dissolvable liner 110 on the label 100. In some embodiments, the adhesive pattern and the displaceable liner pattern may not be in registry. Alternately, in embodiments, one or both of the adhesive and the displaceable liner may not be disposed in a true pattern.

One advantage of the displaceable liner 110 over conventional liners may be that unlike labels having traditional liner plies, the user may ready the label 100 for adhesion to the substrate 50 without the need to discard any liner in a waste basket or elsewhere.

Another advantage of the label 100 (and the other displaceable liner label embodiments disclosed herein) may be the low cost of the label 100. As discussed herein, the label 100 may be made inexpensively at least in part because the label 100, including the dissolvable liner layer(s) disposed thereon, may be relatively thin as compared to other labels. The artisan will understand the thin layers may require fewer raw materials which may translate into cost savings. In an embodiment, for example, the face ply 102 (together with top coat 104 such as the direct thermal coating) may be about 0.003" thick, the hydrophilic layer 106 may be about 0.00001" thick (±0.000005"), the hot melt adhesive grid 108 may be about 0.0008" thick (±0.00004"), and the corresponding displaceable liner 110 grid may be about 0.0002" thick (±0.0001"). In some embodiments, two (or a different number of individual) layers of the dissolvable liner 110 may be applied, and each layer may be about 0.0001" thick. The thickness of the hydrophilic layer 106, the adhesive layer 108, and the dissolvable liner 110, even collectively, may be insignificant compared to the thickness of the face ply 102, whereas conventional linerless compositions may double the size of the face ply (i.e., by adding 0.003" of thickness to the face ply). In addition to cost benefits, the thinness of the labels 100 may allow for storage and transportation benefits to be reaped.

In embodiments, the thickness of the hot melt adhesive layer 108 and the other constituents (e.g., the dissolvable liner 110) may be increased or decreased in line with a particular application. Care may be taken though to ensure that the recesses 108R have sufficient volume to retain the dissolvable liner 110 upon activation. For instance, where the thickness of the adhesive layer 108 is reduced, care may be taken prior to increasing the thickness of the dissolvable liner 110 to ensure that the increased amount of dissolvable liner 110 would be properly received within the pockets 108R of reduced size.

The artisan will thus understand that the dimensions and arrangement of the adhesive pattern 108P may influence the quantity and arrangement of a pattern 110P of the dissolvable liner. For example, where the adhesive pattern 108P comprises relatively thick and wide lines of adhesive (e.g., relatively high and wide crests 108C), a greater amount and relatively wide lines of displaceable liner coating 110 may be required to adequately cover the crests 108C, and this amount of displaceable liner 110 may in turn require larger recesses 108R so that the displaceable liner 110 can be accommodated therein. In embodiments, and as discussed herein, the displacement of the displaceable liner 110 into the pockets 108P may be facilitated by physically moving the label 100 on the substrate 50 (in addition to use of the fluid).

FIG. 5 is a flow chart illustrating a method 500 of making and using the displaceable liner 110, in an embodiment. At step 502, an enabler 222 may be placed in a container together with a facilitator 224. For example, 4 lbs. of PB121-H-Prisco® 222A may be weighed and placed in a container together with 0.25 lbs. of activated coconut carbon filtered water 224A. Thereafter, at step 504, the stabilizer 226 and the slip agent 228 may be added to the mixture. For instance, about 1.2 lbs. (i.e., about 21 heaping teaspoons) of gypsum 226A or 0.18 lbs. of precipitated calcium carbonate 226B may be placed in the container along with about 0.014 lbs. of safflower oil 228A. The quantities of the various ingredients may be proportionally changed or otherwise different. At step 506, the ingredients 202 may be mixed together. For example, in an embodiment, a cutting blade spinning at about 2,000 rpm may be used to mix all the ingredients 202 until the resulting mixture becomes relatively smooth and homogenous. At step 508, a label face stock 102 with the lower side 102L thereof covered with a hydrophilic coating 106 (e.g., an inkjet or other suitable coating) may be provided. The hydrophilic coating 106 may be dried (e.g., by any suitable dryer now known or subsequently developed) after being applied to the face stock lower side 102L. At step 510, the dried hydrophilic coating 106 may be coated with a layer of adhesive 108 (i.e., the adhesive layer 108 may be applied to the lower side 102L such that the hydrophilic coating 106 is between the lower side 102L and the adhesive layer 108). The adhesive 108 may be applied in a pattern 108P, as described above. Once the adhesive pattern 108P is disposed, then, at step 512, a layer of the displaceable liner 110 may be applied and dried. The displaceable liner 110 may be disposed in a pattern 110P. The adhesive pattern 108P (e.g., the quantity of adhesive, the configuration of the pattern, et cetera) may be specifically configured to allow the pockets 108R thereof to receive the displaceable liner therein. As detailed above, the displaceable liner pattern 110P may correspond to the adhesive pattern 108P (e.g., the two patterns may be in registry with each other). Additional layers of the displaceable liner 110 may also be disposed in the same pattern 110P, as it has been found that disposing the displaceable liner 110 in a plurality of layers (e.g., two layers of 0.0001" each instead of one layer that is 0.0002" thick) may facilitate cleaner transition of the displaceable liner 110 into the pockets 108R.

At step 514, indicia may be printed on the upper side 102U of the face stock 102 (e.g., on the topcoat 104 thereof). The label 100 may be printed using any printer (including any conventional printer, such as a direct thermal printer, a thermal transfer printer, a laser printer, et cetera). Specifically, as the label 100 is passed through the printer, the topcoat 104 thereof may receive printed indicia whereas the displaceable liner 110 may cover the face ply lower side 102L and preclude the label 100 from adhering to printer parts. In some embodiments, a cooling module may be used to cool the label 100 at the printer or downstream from the printer, which may keep adhesive from building up on the printer cutter. When the face ply 102 is ready to be adhered to a substrate, the displaceable liner coating 110 may be brought into contact with water or another fluid at step 516 to cause the displaceable liner coating 110 to dispel and reveal the adhesive layer 108 below.

Moisture may be introduced to the face ply 102 directly and/or indirectly. The terms "water", "moisture", "liquid", and "fluid" may be used interchangeably herein. In an embodiment, the substrate 50 (e.g., the box, package, envelope, plastic jug, etc.) and/or a section thereof may be moistened with water and the label bottom side 100B may be placed on the moistened section of the substrate 50 so as to allow the displaceable liner coating 110 to interact with the moisture on the substrate 50 (indirect moistening) and displace (e.g., disperse from the adhesive layer 108). In another embodiment, instead of moistening the substrate 50 and then placing the face ply 102 on the moistened substrate 50, the face ply 102 (i.e., the displaceable liner coating 110 thereof) itself may be moistened to cause the displaceable liner coating 110 to dispel (direct moistening) and then the face ply 102 may be situated on the substrate 50.

If the moisture is applied directly to the displaceable liner coating 110 on the face stock 102, and if the displaceable liner 110B (as opposed to 110A) is used, the face stock 102 may then be adhered to the substrate 50 any time within the next 90 seconds or so. Alternately, if the substrate 50 is moistened instead of directly moistening the displaceable liner coating 110, then the face ply 102 may have to be placed on the moistened section of the substrate 50 within 3-20 seconds or so (as the moisture may thereafter be absorbed by the substrate 50 or otherwise removed and may not be able to serve to activate the displaceable liner coating 110B). Where the displaceable liner 110A is used, the label 100 may be moistened and may be placed on the substrate 50 for secure adhesion thereto even after an extended period (e.g., several hours later). In some embodiments, moisture may be introduced to the displaceable liner coating 110 both directly and indirectly (i.e., the substrate 50 may be moistened and the displaceable liner coating 110 may also be moistened before the face ply 102 contacts the moistened substrate 50).

In embodiments, water (or other fluid) may be added to the substrate 50 and/or the displaceable liner 110 via a sprayer. Use of a sprayer may allow for a small volume of water to be disposed on the substrate 50 and/or the displaceable liner 110 and may reduce the risk that too much water may be disposed on the substrate 50 and/or the label 100, causing damage to the label 100. For example, over saturating the label 100 with fluid may cause the label 100 to undesirably curl and/or disintegrate. In other embodiments, water may be added to the substrate 50 and/or the face ply 102 via other means (e.g., via a different water dispensing mechanism, via a moistened cloth or wipe, et cetera). An alternate spraying mechanism is discussed in greater detail below.

In embodiments, a solution may instead be sprayed onto the substrate 50 and/or the displaceable liner 110. For example, the solution to be sprayed may be a mixture of water and the displaceable liner 110 (e.g., about 1 tsp of displaceable liner 110 mixture for every 16 fluid ounces of water). Experimentation has shown that such a solution may more readily activate the displaceable liner 110 relative to just, for example, water.

At step 518, the moisture introduced to the displaceable liner coating 110 (e.g., directly and/or indirectly) may cause the displaceable liner coating 110 to begin to transition. At step 520, the activating liner 110 may move from the adhesive crests 108C to the recesses 108R. For example, the liner 110 may pool into the recesses 108R with the assistance of the underlying hydrophilic layer 106 whose affinity to the dissolvable liner 110 may serve to retain the dissolvable liner 110 in the pockets 108R. In other words, the hydrophilic properties of the face ply 102 and/or the hydrophilic layer 106 may draw the activated displaceable liner 110 into the pockets that are the recesses 108R.

At step 522, the adhesive layer 108 (e.g., the adhesive crests 108C thereof) may be exposed by the now receding displaceable liner 110 and may be ready to secure the label 100 to the substrate 50. At step 524, if the moisture was introduced to the displaceable liner 110 directly, the label 100 may now be situated on the substrate 50, where, in some embodiments, the substrate 50 may absorb (e.g., partially) the displaceable liner coating 110 (e.g., where the displaceable liner 110B is used). Conversely, if the moisture was introduced to the displaceable liner 110 indirectly (e.g., a section of the substrate 50 was moistened and the displaceable liner 110 was placed in contact with the moistened section of the substrate 50), the moisture on the substrate 50 may cause the displaceable liner coating 110 to dispel and be drawn into the recesses 108R, exposing the adhesive 108.

While the hydrophilic properties of the label 100 may be sufficient to draw the activated liner 110 into the recesses 108R, other methods may be employed in embodiments to facilitate transition the displaceable liner 110 from the adhesive crests 108C to the recesses 108R. For example, at step 526, after the label is brought into contact with the substrate 50, the directly or indirectly moistened label 100 may be physically moved (e.g., a relatively small amount, about 0.5 to 1 mm, etc.) while the label 100 is in contact with the substrate 50. This shifting of the label 100 may facilitate the movement of the displaceable liner 110 relative to the adhesive layer 108 (e.g., via the friction created by contact between the liner 110 and the substrate 50). Shifting the label 100 against the substrate 50 may be accomplished in any suitable manner. For instance, the label 100 may be "actively" shifted, such as by a user or machine (e.g., a vacuum driven tamp head that moves the label against the substrate 50). As another example, the label 100 may be "passively" shifted, such as by the motion of the substrate 50 itself (e.g., the label 100 may be held in place on the substrate 50 while the substrate 50 is moving down a conveyor of an assembly line). Experimentation has shown that, depending on the configuration of the displaceable liner 110, moving the label 100 relative to the substrate 50 after it is placed thereupon may assist in causing the displaceable liner 110 to transition to the pockets 108R. At step 528, the label 100 may bond to the substrate 50 by virtue of the now-exposed adhesive layer 108.

In this way, by needing an activating fluid (e.g., water) to activate the displaceable liner 110, the displaceable liner 110 may remain in the inert state until the label 100 is to be applied to the substrate 50. Furthermore, the requirement for a traditional liner ply may be negated. The amount of activating fluid used to dissolve the liner coating 110 may be negligible (e.g., relative to traditional remoistenable adhesives) and may not cause any appreciable damage to the substrate 50. Once the displaceable liner 110 is wetted (directly and/or indirectly) and the face ply 102 is situated on the substrate 50, the displaceable liner 110 may dispel relatively quickly such that the label 100 can generally simultaneously be adhered to the substrate 50.

The label 100 and the dissolvable liner 110 thereof may operate as intended at room temperature. However, in embodiments, increasing the operating temperature may improve the efficacy (e.g., bond strength, time-to-bond, etc.) of the label 100. As such, in embodiments, the method 500 may include the step of heating the label 100 and/or the substrate 50 prior to the application of the label 100 to the substrate 50. The label 100 or the substrate 50 may be heated to a higher temperature (e.g., up to about 130° F.) in any suitable manner now known or subsequently developed, such as with a fan or an oven with which the substrate 50 passes through. Care may be taken as to not cause damage (e.g., cause burning, curling, etc.) to the substrate 50 and/or the label 100. As such, the temperatures that the substrate 50 and/or the label 100 may be subjected to may be adjusted based on the heat tolerance of the substrate 50 or the label 100 (i.e., objects with a higher heat tolerance may be able to withstand greater temperatures).

It is to be understood that the steps of the method 500 may be modified, added to, and/or omitted as desired, and that such considerations have been contemplated and are within the scope of the present disclosure. For example, the step of heating the substrate 50 and/or the label 100 may be added to the method 500. As another example, the artisan may understand that the method 500 may be readily modified to construct, print, and apply the label 300 (and other embodiments of the displaceable liner label) as described below.

Thus, as has been described, the displaceable liner 110 may, in effect, replace the traditional liner plies of prior art labels, and the label 100 may be used in any application where prior art labels were heretofore employed.

The illustrated simplex label 100, as discussed herein, may be configured for single-sided printing. Such, however, is merely exemplary, and the displaceable liner concept disclosed herein may likewise be used with labels that are printable on both sides. For example, FIGS. 6A through 6B illustrate a simplex label 300—employing a displaceable liner 314—that includes a single ply and is printable on both sides. It is to be understood that the components of the embodiment 300 may be substantially similar or the same as the components of the embodiment 100, except as specifically noted and/or shown, or as would be inherent. Further, those skilled in the art will appreciate that the embodiment 100 (and thus the embodiment 300) may be modified in various ways, such as through incorporating all or part of any of the various described embodiments, for example.

The label 300 may have a face ply 302 top side 300T (FIG. 6A) and a back side 300B. The top side 300T may include a topcoat 304 having a printable coating. The topcoat 304 may allow the top side 300T to receive monochrome and/or color printing via any printing means now known or subsequently developed.

FIG. 6B shows the back side 300B of the label 300. The label 300 may, in an embodiment, include a perforation (or a line of weakness) 306. The perforation 306 may demarcate a central portion 307 circumscribed by a border portion 308. In embodiments, the central portion 307 may be separated from the border portion 308 along the perforation 306. On the top side 300T, in embodiments, each of the central portion 307 and the border portion 308 may include the printable coating 304.

The central portion 307 may include a printable coating 304B opposing the topcoat 304, which may enable the central portion 307 to be printed by any printer. Starting from the central portion 307 and moving away from the top coat 304, the backside border portion 308 may include a hydrophilic layer 312, an adhesive layer 309, and one or more layers of displaceable liner 314. The adhesive layer 309 and the displaceable liner 314 may be generally the same as the adhesive layer 108 and the displaceable liner 110 described above, and thus may exhibit the same or similar properties. The displaceable liner coating 314 may temporarily cover the adhesive layer 309 and preclude the face ply 302 from unintentionally adhering to an object (e.g., a printer roller) until the label 300 is ready to be applied to the substrate 50. The label 300 may thus be printed on both sides (e.g., in a double-sided printer or otherwise), using any printing technology.

The adhesive layer 309 may be arranged in a pattern of crests and recesses, much like the adhesive layer 108 and its pattern 108P of crests 108C and recesses 108R. In embodiments, the adhesive layer 309 (and the hydrophilic layer 312) may be confined to the border region 308. Similarly, the displaceable liner 314 may be arranged in a pattern that generally corresponds to the pattern of the adhesive layer 309, much like the displaceable liner pattern 110P and the adhesive layer pattern 108P. In operation, the adhesive layer 309 and displaceable liner 314 may act similarly to the adhesive layer 108 and the displaceable liner 110. In other words, when activated, the displaceable liner 314 may transition to the recesses of the adhesive layer 309, thus exposing the crests of the adhesive layer 309 for adherence to a substrate 50.

When it is time to adhere the label 300 to the substrate 50 (e.g., a package), the substrate 50 may be moistened (e.g., a small quantity of water may be sprayed on the portion of the substrate to which the label 300 is to be applied). Alternately or in addition, the label 300 may be moistened. In embodiments, only the border region 308 may be moistened so as to not wet the printed indicia on the back side. The label 300 may then be brought into contact with the substrate 50 such that the back side 300B, and specifically the displaceable liner 314 coating disposed thereon, contacts the substrate 50. The moisture may cause the displaceable liner 314 to transition to the adhesive layer recesses. With the adhesive layer 309 now exposed, the label 100 may be secured to the substrate 50. When the recipient receives the package 50, he may disassociate the central portion 307 from the border portion 308 via the perforations 306, and access the indicia printed on the back side 300B of the label 300. In this way, thus, the displaceable liner concept disclosed herein may be used to do away with conventional adhesives and wasteful conventional liners of both single-sided and double-sided labels.

It is to be understood that the label 300 may be constructed, printed, and applied by modifying the steps of the method 500 accordingly. For example, the method 500 may be modified such that the adhesive layer 309 and the displaceable liner 314 are only placed in the border portion 308 of the label 300.

The illustrated labels 100 and 300, as discussed herein, may each include only a single face ply for printing thereon. Such, however, is merely exemplary, and the displaceable liner concept disclosed herein may likewise be used with labels that include two or more face plies (e.g., a duplex label). For example, FIGS. 7A-7C illustrate an embodiment 400 of a duplex label with the displaceable liner. Embodiment 400 is substantially similar to the embodiment 100, except as specifically noted and/or shown, or as would be inherent. Further, those skilled in the art will appreciate that the embodiment 100 (and thus the embodiment 400) may be modified in various ways, such as through incorporating all or part of any of the various described embodiments, for example.

The label 400 may have a top side 400T and a back side 400B. Starting from the top side 400T of the label 400 in FIG. 7A, a first face ply 402 is shown. A first face ply upper face 402U may include a first topcoat 404 having a printable coating. The first topcoat 404 may allow the upper face 402U to receive monochrome and/or color printing via any printing means now known or subsequently developed. The dimensions of the first topcoat 404 may be substantially equal to that of the first face ply 402, such that the entirety of the first face ply upper face 402U may be configured for printing. Alternatively, only a portion of the first face ply upper face 402U may be configured for printing.

Continuing from the first face ply 402 downward, a first displaceable liner portion 413 may be located between the first face ply 402 and a second face ply 403 (i.e., the first displaceable liner 413 may be in contact with a first ply lower face 402L and a second face ply upper face 403U). The first displaceable liner layer 413 may be substantially similar to the displaceable liner 110 (i.e., both displaceable liners 413 and 110 may be constructed using the steps from the method 500). In operation, the first displaceable liner layer 413 may serve to secure the first face ply 402 and the second face ply 403 together. That is, the first displaceable liner layer 413 may be activated (e.g., by water) and may then be absorbed by the first face ply 402 and the second face ply 403 to create a bond therebetween. Alternately or additionally, the first face ply 402 and the second face ply 403 may be adhered using a hot-melt or other adhesive (e.g., adhesive 108, adhesive 309, et cetera).

In embodiments, the length and/or the width of the area of the face ply 402 on which the first displaceable liner 413 is disposed may be disparate from the length and/or the width of the first face ply 402. For example, as shown in FIG. 7A, the first displaceable liner 413 may fit within the perimeter of the first face ply 402 such that there may be a non-zero distance between each edge of the first displaceable liner 413 and the edges of the first face ply 402.

The second ply lower face 403L may be entirely covered with a second topcoat 405 (FIG. 7B) having a printable coating. The second topcoat 405 may allow for the second ply lower face 403L to receive monochrome and/or color printing via any printing means now know or subsequently developed. In embodiments, the length and/or the width of the second face ply 403 may be disparate from the length and/or the width of the first face ply 402. For example, the second face ply 403 may fit within the perimeter of the first face ply 402 such that there may be a non-zero distance between one or more edges of the second face ply 403 and the edges of the first face ply 402 (see FIG. 7C). As another example, the dimensions of the second face ply 403 may generally match the dimensions of the first displaceable liner 413.

Displaceable liner 414 may be disposed such that at least a portion of the displaceable liner 414 is adjacent and in contact with an adhesive layer 409 that is located on the first ply lower face 402L (see FIG. 7C). While some embodiments of the label 400 may have the second face ply 403, the topcoat 405, and the displaceable liner 414 arranged in an overlapping manner, other embodiments of the label 400 may have second topcoat 405 boundaries that are defined by a border portion 408 where the displaceable liner 414 may be arranged (i.e., there may be little to no overlap between the second topcoat 405 and the displaceable liner 414 layers in the border portion 408). The border portion 408 may be provided on a part of the first ply lower side 402L adjacent the outer boundaries of the first ply 402, and may, in embodiments, also overlap part of the second ply lower side 403L adjacent the outer boundaries thereof. Thus, the second ply lower face 403L may have a central region 407 that is devoid of the displaceable liner 414 and is printable by virtue of the second topcoat 405. That is, the label 400 layers may be formed such that at least a part of the central region 407 and the topcoat 405 arranged thereon remains exposed (e.g., for printing) once the label 400 construction is complete. In this manner, the label 400 may be configured for double-sided printing (e.g., successive and/or simultaneous printing). The artisan would understand that the border portion 408 may include the space that is bound by both the perimeter of the central portion 407 and the perimeter of the largest label 400 layer (e.g., the first face ply 402 in FIG. 7A). Alternatively, the border portion 408 may include any amount of space along the label 400 as long as at least a portion of the central region 407 remains exposed. In embodiments, the border portion 408 does not encompass the entirety of the perimeter of the central region 407 (e.g., the border portion 408 may consist only of one or more strips located at opposing sides of the central region 407). In operation, non-uniform label 400 layer dimensions may allow some layers to contact other layers to increase label 400 structural integrity.

Some embodiments may include perforation and/or die cut lines (i.e., lines of weakness) 406 to facilitate access to the second ply lower side 403L after the label 400 has been adhered to the substrate 50. For example, the first face ply 402 and/or the second face ply 403 may contain perforations/die cuts 406 that generally demarcate the central region 407. These lines of weakness 406 may be exploited to separate a portion of the label 400 from the remainder, thus exposing the central portion 407 for viewing. Because any indicia printed onto the second ply lower side 403L may be hidden from view until a user tears the lines of weakness 406 of the label 400, private or personalized indicia may be arranged there. For instance, a private message, a packing slip detailing package contents, and/or advertisement materials may be located on the second face ply lower side 403L. Conversely, the first face ply upper face 402U may have public information indicia, such as a shipping/mailing address.

At the bottom side 400B of the label 400, there may be the second displaceable liner 414. The second displaceable liner 414 may be generally the same as or similar to the first displaceable liner 413, though in embodiments the second displaceable liner 414 may differ (e.g., by containing different amounts of ingredients 202). The second displaceable liner 414 may be arranged along the border portion 408 such that displaceable liner 414 may cover the hydrophilic coating 412. While not indicated in this figure, the displaceable liner 414 (and/or 413) may be disposed on the label 400 in a plurality of layers.

The adhesive layer 409 may be arranged in a pattern of crests and recesses, much like the adhesive layer 108 and its pattern 108P of crests 108C and recesses 108R. Similarly, the displaceable liner 414 may be arranged in a pattern that generally corresponds to the pattern of the adhesive layer 409. In operation, the adhesive layer 409 and displaceable liner 414 may act similarly to the adhesive layer 108 and the displaceable liner 110. In other words, when activated, the displaceable liner 414 may transition to the recesses of the adhesive layer 409, thus exposing the crests of the adhesive layer 409 for adherence to a substrate 50. The substrate 50 may be a porous substrate or a non-porous substrate.

The displaceable liner coating 414 may temporarily cover the adhesive layer 409 and preclude the label 400 from unintentionally adhering with an object (e.g., a printer roller) until the label 400 is ready to be applied to the substrate 50. The label 400 may thus be printed on both sides (e.g., in a double-sided printer or otherwise). When it is time to adhere the label 400 to the substrate 50 (e.g., a package), the substrate 50 may be moistened (e.g., a small quantity of water may be sprayed on the portion of the substrate to which the label 400 is to be applied). The label 400 may then be brought into contact with the substrate 50 such that the back side 400B, and specifically the second displaceable liner 414 coating disposed thereon, contacts the moistened substrate 50. The moisture may cause the second displaceable liner 414 to dispel and move into the recesses of the adhesive layer 409. The label 400 may also be shifted after it is placed on the substrate 50 to facilitate the transition of the dissolvable liner 414 into the pockets, as discussed above. Now exposed, the adhesive 409 may contact and secure to a substrate 50. In embodiments having perforation, die-cuts, or other lines of weakness, the recipient of the package may disassociate the central portion 407 (or other portion defined by the lines of weakness) from the border portion 408, and access the indicia printed on the second ply lower face 403L. In this way, thus, the displaceable liner concept disclosed herein may be used to do away with wasteful conventional liners of both single-sided and double-sided labels.

It is to be understood that the label 400 may be constructed, printed, and adhered by modifying the steps of the method 500 accordingly. For example, the step of adhering a first face ply 402 and second face ply 403 together with an adhesive or displaceable liner mixture may be added to the method 500.

The label 400 as discussed herein may be one example of a duplex label with the dissolvable liner. Yet another duplex label with the displaceable liner concept is shown in FIGS. 8A-8D, which illustrate an embodiment 600. Embodiment 600 is substantially similar to the embodiment 400 except as specifically noted and/or shown, or as would be inherent. Further, those skilled in the art will appreciate that the embodiment 400 (and thus the embodiment 600) may be modified in various ways, such as through incorporating all or part of any of the various described embodiments, for example.

The label 600 may have a top side 600T and a back or bottom side 600B. Starting from the top side 600T of the label 600 in FIG. 8A, a first ply 602 is shown. A first ply upper face 602U may include a topcoat 604 having a printable coating (e.g., a direct thermal coating, an inkjet coating, a thermal transfer coating, et cetera). The topcoat 604, which may, in embodiments, cover the entirety of the first ply upper face 602U, may allow the upper face 602U to receive monochrome and/or color printing via any printing means now known or subsequently developed. The first ply 602 may have a central portion 607T, which may be demarcated by one or more lines of weakness 605 (e.g., perforations, die cuts, etc.). In embodiments, the entire first ply 602 may have printable coating. Alternatively, only a portion of the first ply (e.g., the central portion 607T thereof) may be configured for printing. In such an embodiment, one or more first ply border portions 608T may be devoid of the topcoat 604.

In embodiments, one or more boundaries or edges 618 of the label 600 may have non-linear geometry. For example, as illustrated in FIG. 8D, one boundary 618 may include a wavy or non-linear edge 620. While a wavy edge 620 is depicted in FIG. 8D, such a non-linear edge 620 shape is merely illustrative, and other non-linear shapes are envisioned for the edge 620 (e.g., a zig-zag shape, an undulating shape, a corrugated shape, et cetera). The non-linear edge 620 may mitigate some or all of the chance that the label 600 may undesirably bond to a surface, such as a printer part when the label 600 is undergoing printing. The artisan would understand that this utility may be desirable in other labels, thus it is contemplated herein that other label embodiments (e.g., labels 100, 200, 300, 400, etc.) may be modified to include a non-linear edge.

Continuing from the first face ply 602 downward, a displaceable or dissolvable liner portion 610 may be located between the first ply 602 and a second ply 603 (i.e., the first displaceable liner portion 610 may be in contact with a first ply lower face 602L and a second ply upper face 603U). In embodiments, the first displaceable liner portion 610 may cover an entirety of the first ply lower face 602L, while in other embodiments the first displaceable liner portion 610 may cover only a portion of the first ply lower face 602L (e.g., in a pattern). The first displaceable liner portion 610 may include a first hydrophilic coating 612 and a first dissolvable liner layer 614. The first dissolvable liner layer 614 may be substantially similar to the displaceable liner 110 (i.e., both displaceable liner layers 614 and 110 may be constructed using the steps from the method 500). In operation, the first displaceable liner portion 610 may serve to secure the first face ply 602 and the second face ply 603 together. That is, the first displaceable liner layer 614 may be activated (e.g., by water) and may then be absorbed by the first face ply 602 and/or the first hydrophilic coating 612, and the second face ply 603 to create a bond therebetween. Alternately or additionally, the first face ply 602 and the second face ply 603 may be adhered using a hot-melt or other adhesive (e.g., adhesive 108, adhesive 309, et cetera).

Continuing downward, the dissolvable liner layer 614 may contact the second ply upper side 603U of the second ply 603. The second ply 603 may be like the first ply 602, except the second ply 603 may have smaller dimensions than the first ply 603. As seen in FIG. 8C, one or more outer edges of the second ply 603 may be inwardly adjacent external regions 606 of the displaceable liner 610. That is, the external regions 606 may be one or more areas that are outwardly adjacent of the second ply 603. Thus, the second ply 603 may reside only in a second ply region 607B, and the dissolvable liner 614 may be exposed (e.g., exposed for contact with the substrate 50) in the external regions 606. In embodiments, the second ply 603 may be smaller (e.g., have less width) than the first ply central portion 607T. This may result in some non-zero distance between two or more adjacent edges of the perimeter of the central portions 607T and the second ply 603, when the second ply 603 is adhered to the first ply central portion 607T via the displaceable liner 610. This non-zero distance between edges may be seen in FIG. 8A, where the boundaries of the second ply 603 are inwardly adjacent the perforations 605 that define the first ply central portion 607T.

Further downward, a lower face 603L of the second ply 603 may have a coating 609, as illustrated in FIG. 8C. Like the topcoat 604, the coating 609 may be a printable coating that may receive monochrome and/or color printing via any printing means now know or subsequently developed, thus enabling the printing of indicia on the second ply lower side 603L. The coating 609 may have dry tac properties (e.g., temporary adhesive properties), and in embodiments, may be used because of its superior abilities to accept printed indicia. In an embodiment, the coating 609 may be a layer that may change between a first state, second state, and third state. The coating 609 first state may be where the coating 609 does not have any significant adhesive properties, and is activatable with a fluid or by another method. Once activated, in the second state, the coating 609 may exhibit adhesive properties. The coating 309 may transition (e.g., after a period of time) to the third state, where the coating 309 adhesive properties may diminish (e.g., partially, entirely). In use, the coating 609 may be applied to the second ply lower face 103L, where it may reside in the first state until a fluid is applied to the coating 609. Then, the coating 609 may transition to the second state, and may be brought into contact with a substrate 50 and adhere thereto. Next, the adhesive properties of the coating 609 may diminish (e.g., by drying out). In embodiments, the coating 609 may instead transition between only two of the above states. For example, the coating 609 may instead exhibit adhesive properties inherently (e.g., after being applied to the second ply lower face 103L), and then those adhesive properties may diminish over time as the coating 609 dries (e.g., after the coating 609 is brought into contact with the substrate 50). Similar to the topcoat 604, the coating 609 may partially or entirely cover the second ply 203 (i.e., second ply central portion 607B). The lines of weakness 605 may allow the central portion 607T to be disassociated from the label 600 after the label 600 is secured to a package. When the central portion 607T is so disassociated, the second ply 603 may remain adhered to the central portion 607T of the first ply 602, and thus allow for indicia printed on the bottom face 603L of the second ply 603 to be read. When the central portion 607T of the first ply 602 and the second ply 603 are so removed, the border portion 608T of the first ply 602 may remain on the substrate.

Because any indicia printed onto the second ply lower side 603L may be hidden from view (e.g., by the substrate the label 600 is applied to) until a user exploits the lines of weakness 605 of the label 600, private or personalized indicia may be arranged there. For instance, a private message, a packing slip detailing package contents, and/or advertisement materials may be located on the second ply lower side 603L. Conversely, the first face ply upper face 602U may have public information indicia, such as a shipping/mailing address.

The displaceable liner coating 614 may selectively preclude the label 600 from unintentionally adhering with an object (e.g., a printer part) until the label 600 is ready to be applied to the substrate 50. The label 600 may thus be printed on both sides (e.g., in a double-sided printer or otherwise). When it is time to adhere the label 600 to the substrate 50 (e.g., a package, a porous surface, etc.), the substrate 50 and/or the displaceable liner portion 610 may be moistened (e.g., a small quantity of water may be sprayed on the dissolvable liner layer 614 and/or the portion of the substrate to which the label 600 is to be applied). The label 600 (e.g., the dissolvable liner portion 610 and the coating 609 thereof) may then be brought into contact with the substrate 50 such that the back side 600B contacts the moistened substrate 50. The moisture may cause the displaceable liner layer 614 to dispel and move into the first ply 602 and the substrate 50. Now dispelled, the dissolvable liner layer 614 may dry and secure the label 600 to the substrate 50. A recipient of the substrate 50 may disassociate the central portions 607T and 607B (or other portion), as defined by the lines of weakness 605, from the border portions 608T, and access the indicia printed on the second ply lower face 603L. In this way, the displaceable liner concept disclosed herein may be used to do away with wasteful conventional liners of both single-sided and double-sided labels.

The artisan would understand that the label 600 may be constructed, printed, and adhered by modifying the steps of the method 500 accordingly. For example, the steps of adhering a first face ply 602 and second face ply 603 together with the displaceable liner portion 610 and printing on the coating 609 may be added to the method 500.

The artisan would understand that FIGS. 8A-8D are shown for illustrative purposes and that the figures are not to scale. Similarly, the dimensions of the label 600 components may differ from what is shown. While not indicated in the figures, the dissolvable liner portions 610 may be disposed on the label 600 in a plurality of layers. In some embodiments, the displaceable liner portions 610 may forego a hydrophilic coating, though it may reduce the effective bonding strength of the dissolvable liner layers 614.

Thus, as has been described, the displaceable liner disclosed herein may serve to do away with traditional liner and adhesive layers, and in so doing, provide a label that is relatively more environmentally friendly. Moreover, the labels using the displaceable liners disclosed herein may significantly reduce the manufacturing costs of the labels. Indeed, according to some preliminary estimates, just circumventing the need for a disposable liner may reduce the cost of traditional labels (i.e., labels having silicone laden liner plies) by up to 50%.

While embodiments of the displaceable liner may be incorporated with labels as described above, other embodiments of the displaceable liner may be incorporated with tape, such as adhesive tape. Conventional adhesive tape may use a remoistenable adhesive. That is, conventional adhesive tapes may use a type of adhesive that must be moistened, often with water, before the adhesive is active for adhering to a substrate. The remoistenable adhesive of the conventional tape may require a relatively large amount of water to activate, and once the remoistenable adhesive has been activated, it may have reduced adhering strength in subsequent activations if left to dry without being applied to a substrate.

In the embodiments discussed above, the displaceable liner (e.g., the liner 110, 314, and/or 410) is displaced by the water, allowing the various labels to be adhered to the substrate 50. The displaceable liner may be absorbed at least in part by the substrate 50, thus facilitating the exposure of the adhesive layer. In some applications, however, the substrate 50 may be unable to absorb water (or other liquids). For example, where the substrate 50 is glass, a plastic film, etc., it may be unable to absorb the displaceable liner displaced from the label when compared to, for example, a porous substrate. However, the inability of the displaceable liner to dissolve into the non-porous substrate may not hinder adhesion of the tape or label to the substrate because the displaceable liner may transition to the pockets and thereby move out of the way of the adhesive and thus allow the adhesive to do its job to secure the tape or label to the substrate.

In some embodiments, the displaceable liner of label 100, and its embodiments (e.g., embodiments 300 and 400), may instead be used in an adhesive tape 100' (e.g., masking tape, painter's tape, duct tape, packaging tape, et cetera). The adhesive tape embodiments 100' may have many of the same, or similar, components as the label 100. For example, and as shown in FIG. 9, the adhesive tape 100' may have a face ply 102' (e.g., paper or film) corresponding to face ply 102, an adhesive 108' corresponding to adhesive 108, and a displaceable liner 110' (e.g., a hydrophilic layer 106' and a displaceable liner layer 110') corresponding to displaceable liner 110. The displaceable liner 110' may be made with ingredients 202 (e.g., enabler 222, facilitator 224, stabilizer 226, and a slip agent 228) as discussed above. A difference between the label 100 and the adhesive tape 100' may be that the adhesive tape 100' may have a relatively long length compared to the label 100 (e.g., while the label 100 may be around the size of a shipping label, the adhesive tape 100' may be a relatively long length of tape which may be wrapped around a cylinder). Indicia (e.g., icons, text, logos, graphics, colors, etc.) may still be printed or otherwise added to the face ply 102' (e.g., the top side 100T' of the face ply 102'). The adhesive tape 100' may have indicia printed thereon via thermal transfer methods (e.g., flexo printing, offset printing, et cetera) or other printing methods. In embodiments, the face ply 102' of the tape 100' may not be printable. Such may provide cost savings as compared to printable tape.

The artisan will understand that the tape 100' may require less water for application relative to conventional remoistenable adhesive tape. In embodiments, the adhesive tape 100' may require about $1/10^{th}$ of the amount of water a conventional remoistenable adhesive tape would require activating the adhesive layer.

In some embodiments, the adhesive tape 100' may be incorporated with a dispenser 700 (FIG. 10). The dispenser 700 may include a roller 750 (e.g., a cloth roller, also referred to herein as a moistener) configured to retain water for moistening the displaceable liner 110' of the adhesive tape 100'. The adhesive tape 100' may pass over the moistened roller 750 to apply the water necessary to dispel the displaceable liner 110'. One advantage of the adhesive tape 100' compared to conventional remoistenable tape may be that the relatively reduced thickness of the tape 100' may allow for a greater quantity thereof to be retained for use in the dispenser 700.

The artisan will understand that the tape 100' may be constructed, printed, and applied by modifying the steps of the method 500 accordingly. For example, the method 500 may be modified to include the steps of applying the adhesive layer 108' in a pattern of crests and recesses, and applying the displaceable liner layer 110' on top of the adhesive layer 108' peaks.

Focus is directed now to FIGS. 11-17, 17A, and 18-20 to illustrate how application of labels employing the dissolvable liner (e.g., label 100, 300, 400, et cetera) may be automated in full or in part. Label applicators for applying labels (e.g., shipping labels, return labels, product labels, etc.) to substrates are known in the art. A traditional label applicator apparatus comprises a printer for printing indicia on the label and a tamp head which in its original position is situated upwardly adjacent the printed label. The tamp head working surface extends generally horizontally and may have vacuum nozzles or other means for holding the label to the tamp head during the application process. The printer prints indicia on the label and the label is pushed laterally underneath the tamp head. The tamp head remains stationary until the printing of the label is complete and the label is brought in registry with the tamp head above the label. Once the label printing is complete and the entire label is below and in registry with the tamp head, the tamp head moves vertically downward towards a substrate and, due to the vacuum, causes the printed label to travel with the tamp head. The tamp head eventually sandwiches the printed label between itself and the substrate (e.g., the package to which the label is to be adhered, which may be brought underneath the tamp head via a conveyer belt for instance). The adhesive on the underside of the label (e.g., on the face stock thereof) causes the label to adhere to the substrate. The tamp head then moves vertically back up to its original position, and the next label is subsequently printed and situated underneath the tamp head so that the tamp head can apply the next label to the next substrate (e.g., another box on the moving conveyer belt). This process is repeated for each label that is printed and applied to a substrate.

One issue with the traditional label applicator is that the next label cannot be prepared for application (e.g., printed) until the tamp head returns to its original position after applying the preceding label. This is because if the next label were to be printed (and all or part thereof were to exit the printer), the tamp head would not be able to move vertically upwards to its original position without interacting with the next label. Such interaction between the tamp head and the fully or partially printed label may be problematic because the conventional label, because of its exposed adhesive, may undesirably stick to the tamp head as the tamp head moves upward from its lowermost position (upon applying the label) toward its original position. To preclude such contact, the printer of the prior art labeling apparatus typically waits to print the next label until after the tamp head has applied the preceding label to the substrate and has returned to its original position thereafter. Once the preceding label has been applied and the tamp head has returned to its original position, the printer then prints the next label. As before, the next label is brought into registry with the tamp head, and once the printing is complete, the tamp head moves downward and sandwiches the next label between the tamp head and the next substrate to cause the next label to adhere to the next substrate.

It may be inefficient to have to wait to start printing the next label until after the tamp head has returned to its original position after applying the preceding label to a substrate (which may be referred to herein, as a "wait time" or a "waiting time requirement"). The wait time is downtime which may reduce the number of labels that may be printed and applied to substrates in a period of time (e.g., every minute). Such downtime may be particularly undesirable because the process of printing and applying labels to substrates may be repeated a multitude (e.g., many thousands) of times every day. Elimination of this waiting time requirement may allow for additional labels to be printed and applied in a time period (e.g., each minute), and consequently, improve the efficiencies of the label printing and application process and reduce the costs associated therewith. Embodiments of the present disclosure may relate to a label making and applying apparatus that eliminates the waiting time requirement.

FIGS. 11 through 14 show a label making and applying system embodiment 1000 (also referred to herein as the "labeling apparatus"). The labeling apparatus 1000 may be used to print labels (e.g., labels 100, labels 300, labels 400, tape 100', etc.) and may, in embodiments, include a staging area 1100, an automated or semi-automated arm 1200, and a tamp head 1300. The labeling apparatus 1000 may also have associated therewith means (e.g., a conveyer belt) to allow for one or more substrates 50 (e.g., a cardboard or other box, a surface, a ply, clothing, packaging, etc.) to be successively placed at a location where a label may be adhered thereto by the apparatus 1000. In embodiments, the labeling apparatus 1000 may make use of a computing system 1600 (FIG. 20) to perform the functions described herein.

Figure 12:
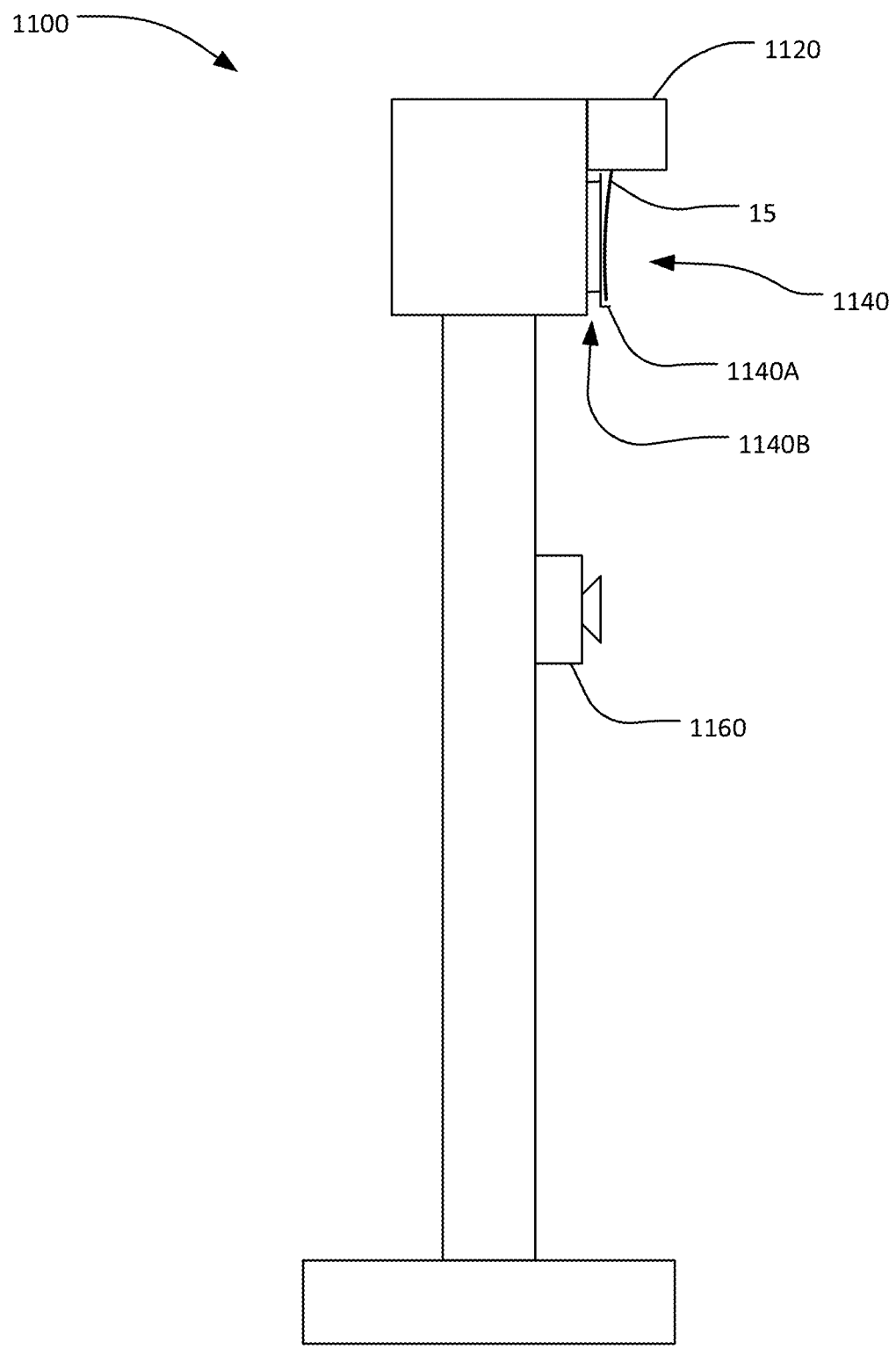
FIG. 12 is a side view of a staging area of the label printing and applying system of FIG. 11.

As seen in FIG. 12, the staging area 1100 may in embodiments comprise a printer 1120 and a holding tray 1140. The printer 1120 may be any printer now known or subsequently developed (e.g., a laser printer, an inkjet printer, a direct thermal printer, a thermal transfer printer, a commercial printer, a handheld printer, etc.) for suitably printing the label, and may be configured to print indicia (e.g., personalized and/or generic indicia, color and/or black and white indicia, etc.) thereon. The holding tray 1140 may be configured to hold labels (e.g., a label 100) during the printing process and/or after the label has been printed by the printer 1120 (e.g., until the tamp head 1300 returns to its original position after applying the preceding label, as discussed herein). The printer 1120 may print relevant indicia (e.g., packaging information, shipping information, marketing materials, etc.) on the label, and deposit the label in the holding tray 1140. In an embodiment, the printer 1120 may begin the printing of an additional label as soon as the preceding label is removed from the holding tray 1140. In another embodiment, the printer 1120 may begin printing the next label within 1, 2, 3, or 4 seconds of the removal of the preceding label from the tray 1140.

The holding tray 1140 may be a receptacle (e.g., a plate, bin, tub, tray, etc.) configured to receive and hold the labels processed by the printer 1120 for the tamp head 1300. The holding tray 1140 may, in embodiments, extend generally vertically. In embodiments, the holding tray 1140 may have a lip or one or more protruding edges 1140A (which may extend generally laterally or otherwise be perpendicular to the vertically extending portion of the holding tray 1140) to aid in holding the label within the holding tray 1140 after the label has been printed by the printer 1120. In other embodiments, the holding tray 1140 may have a textured plasma or other coating configured to inhibit the labels from undesirably adhering to the holding tray 1140.

Alternately or additionally to the lip 1140A, the holding tray 1140 may, in embodiments, be charged with a vacuum to hold the label within it. For example, the holding tray 1140 may include a vacuum plate 1140B configured to selectively retain the label with an applied vacuum. The vacuum plate 1140B may, for example, apply the vacuum constantly, intermittently (e.g., at timed intervals that are in synchronization with a printing cycle of the printer 1120), manually, and/or automatically. The vacuum plate 1140B may automatically apply the vacuum in response to, for example, a sensor (e.g., a sensor 1280) detection of the printed label. As another example, the vacuum plate 1140B may automatically apply the vacuum in response to a signal from the printer 1120 indicating that that the printing of the label is (or is about) complete and the label will be deposited within the holding tray 1140.

To allow the label to be collected by the automated arm 1200, the vacuum plate 1140B may cease operation and release the label from the vacuum plate 1140B vacuum. Similar to the methods of applying the vacuum described above, the label may be released from the vacuum plate 1140B intermittently (e.g., at timed intervals that are in synchronization with a collection cycle of the automated arm 1200), manually, and/or automatically. The vacuum plate 1140B may automatically release the label in response to, for example, a sensor (e.g., a sensor 1280) detection that the automated arm 1200 is ready, or is about ready, to collect the label. As another example, the vacuum plate 1140B may automatically release the label in response to a signal from the automated arm 1200 indicating that the automated arm is prepared to collect the label. In some embodiments, the vacuum plate 1140B may apply a vacuum charge that is configured to be overpowered or otherwise replaced by another vacuum charge (e.g., by a vacuum charge of the tamp head 1300, as will be discussed in greater detail below). That is to say, the vacuum plate 1140B vacuum may be overridden by a vacuum from another source, and thus the other source may collect the label form the holding tray 1140.

As discussed above, a label having a displaceable liner or a displaceable adhesive liner may transition to the activated state (and thus be made ready for adherence to a surface) once said liner is brought into contact with a fluid. As such, the staging area 1100 may, in embodiments, comprise a sprayer or other fluid dispensing means 1160 downstream the printer 1120, as shown in FIG. 12. In embodiments, the sprayer 1160 may be downstream the holding tray 1140. The sprayer 1160 may be fluidly coupled to a tank for retaining fluid (e.g., water or other fluid for dispelling the displaceable liner to expose the adhesive in case of the displaceable liner label or for otherwise activating the displaceable liner in case of the displaceable adhesive liner label).

In embodiments, the sprayer 1160 may spray the fluid onto the label, e.g., on the underside thereof, before the label is adhered to the surface or substrate 50. Alternately or in addition, the sprayer 1160 may be used to spray fluid onto the substrate 50 itself before the label is brought in contact therewith. The fluid dispensing means 1160 may, in embodiments, include a pump, a spray nozzle, valves, delivery tubes, etc., to allow for the fluid to be dispersed as desired (e.g., onto the underside of the printed label as the printed label travels from the holding tray 1140 and comes adjacent the sprayer 1160, onto the substrate 50 prior to the application of the label thereto, et cetera). The artisan will understand from the disclosure herein that liners other than the displaceable liners may also, in embodiments, be employed with the label. Alternately, the label may employ no liner (i.e., the label may have an exposed adhesive layer) and the holding tray 1140 may include a non-stick or other adhesion-resistant coating to preclude undue interaction between the exposed adhesive layer and the holding tray 1140.

One example of a sprayer 1160 usable with the labeling apparatus 1000 is a pulse width modulation (PWM) flow control sprayer. PWM flow control sprayers, like Spraying Systems Co.'s Pulsajet® spray nozzle, may spray at several thousand cycles a minute (e.g., 10,000 cycles a minute) to allow for continual use on an assembly line. PWM flow control may allow a great control over the spraying function of the sprayer 1160, and thus wastage of sprayed fluids may be mitigated while coverage of the sprayed object (e.g., the labels) may remain consistent.

Figure 13:
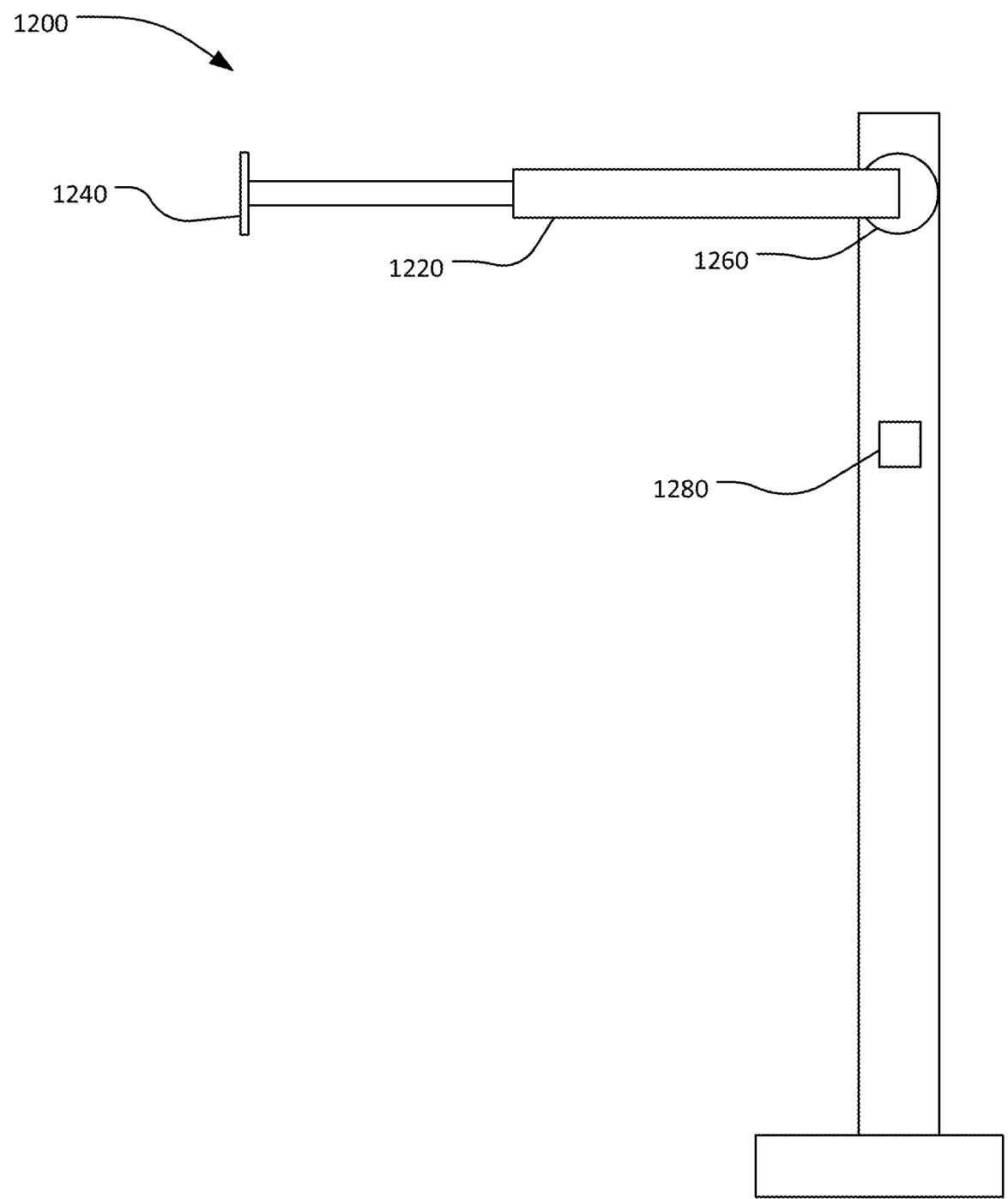
FIG. 13 is a side view of an automated arm of the label printing and applying system of FIG. 11.

The arm 1200, as seen in FIG. 13, may comprise a plunger 1220, a plate 1240, a rotation device 1260, and one or more sensors 1280. The plunger 1220 may be configured to be telescoping (or may otherwise be configured to selectively retract, extend, and/or otherwise adjust position), and may have a plate 1240 attached to a distal end thereof. The plate 1240 may be configured to hold the tamp head 1300 (see FIG. 11), and may, in embodiments, comprise vacuum nozzles to charge the tamp head 1300 with a vacuum. The rotation device 1260 may be operably coupled to a proximal end of the plunger 1220 and may be configured to cause the arm 1200 to rotate (or otherwise move) such that the tamp head 1300 pulls the printed label from the tray 1140 and eventually brings the label in proximity with the substrate 50 for adhesion of the label thereto. In embodiments, before the label is applied to the substrate, the arm 1200 may cause the label to be brought proximate the sprayer 1160 so that the sprayer may spray fluid on an underside of the label to activate the displaceable liner or the displaceable adhesive liner. In other embodiments, the sprayer 1160 may directly moisten the substrate 50 before the label is brought into contact therewith by the arm 1200. In such cases, the liner may activate when the liner is brought into contact with the wetted substrate 50.

One or more sensors 1280 (e.g., LiDAR, infrared, etc.) may be used to detect the presence of the substrate 50, and aid in the process of applying a label to the surface 50. That is, the arm 1200 may move the tamp head 1300 to the tray 1140 for collection of a label, and then, using the sensors 1280, move the tamp head 1300 together with the label to cause the tamp head 1300 to adhere the label to the substrate 50. Importantly, printing of the next label may advantageously begin as soon as the tamp head 1300 removes the preceding label from the tray 1140, resulting in valuable time savings. That is, and as will become clear from the disclosure herein, the waiting time requirement of prior art label applicators may be eliminated or otherwise mitigated.

Figure 14:
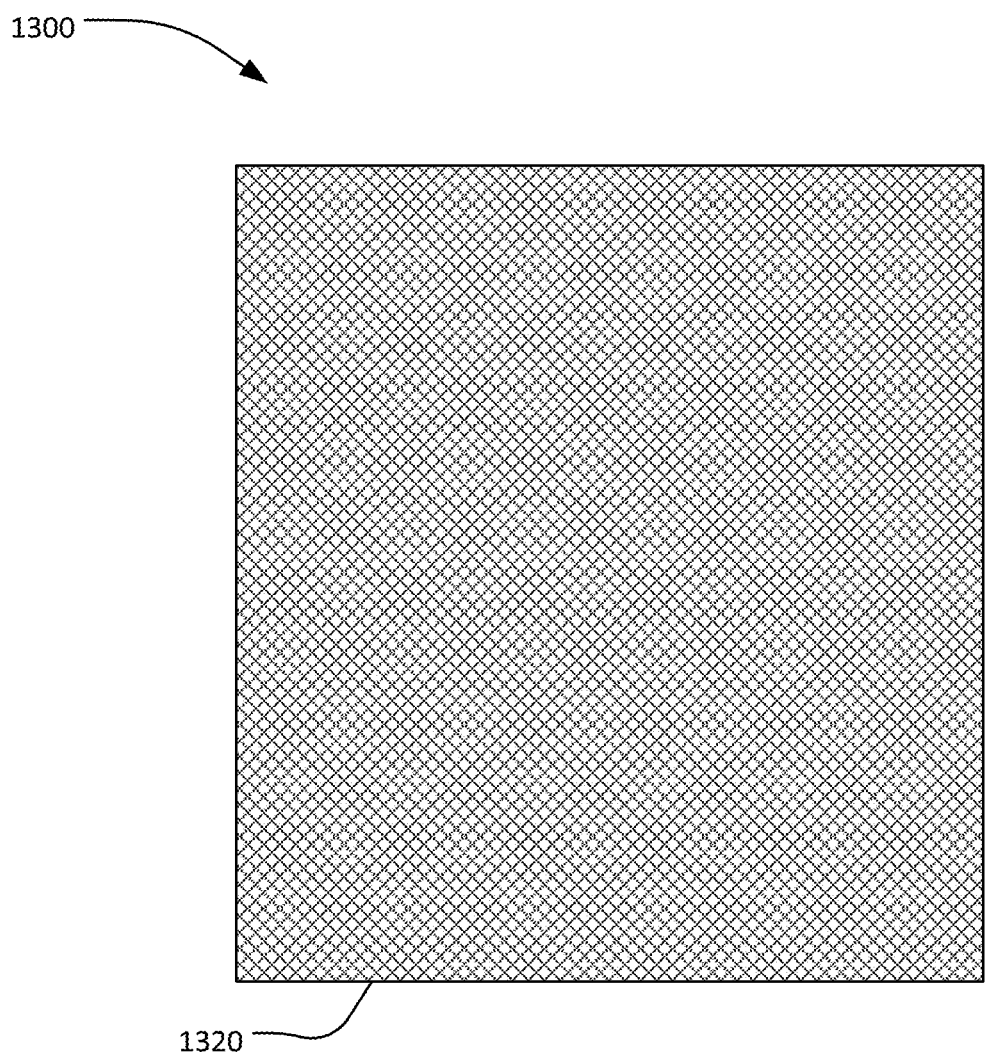
FIG. 14 is a close-up bottom view of a tamp head of the label applicator system of FIG. 11.

The tamp head 1300, as seen in FIG. 14, may in embodiments comprise filter media 1320 made of a compressible material which may be charged with a vacuum. For example, the filter media 1320 may comprise a foam block about two inches thick, which easily allows air to pass through the block. The filter media 1320 may be attached to the arm 1200 via the plate 1240. In operation, the vacuum charged filter media 1320 may be used for the collection of a label from the holding tray 1140 and for the subsequent application of the label to the substrate 50.

In embodiments, multiple apparatuses 1000 may be provided, e.g., in line, to allow for various labels and associated documents to be printed and applied to the substrate 50 as the substrate 50 travels to the various apparatuses 1000 on a conveyer belt. For instance, in embodiments, one labeling apparatus 1000 may be used to print and apply to the substrate 50 the label, another downstream label applicator 1000 may be used to print and apply to the substrate 50 a packing list (which may, e.g., be secured above the label), yet another downstream apparatus 1000 may be used to adhere a coupon above the packing list, etc.

Figure 15:
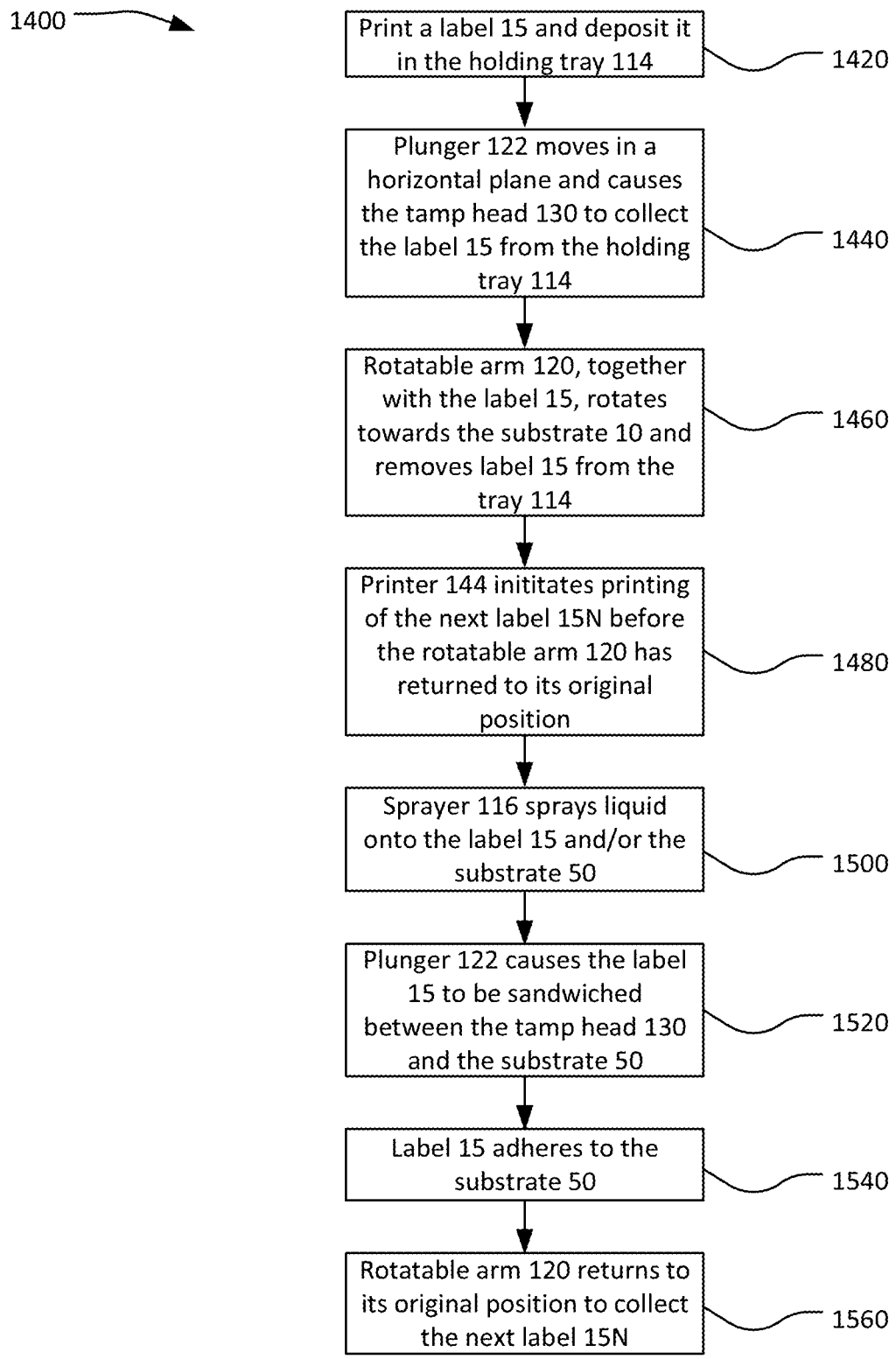
FIG. 15 is a flow chart illustrating a method for operating the label printing and applying system of FIG. 11, in an embodiment.
Figure 16:
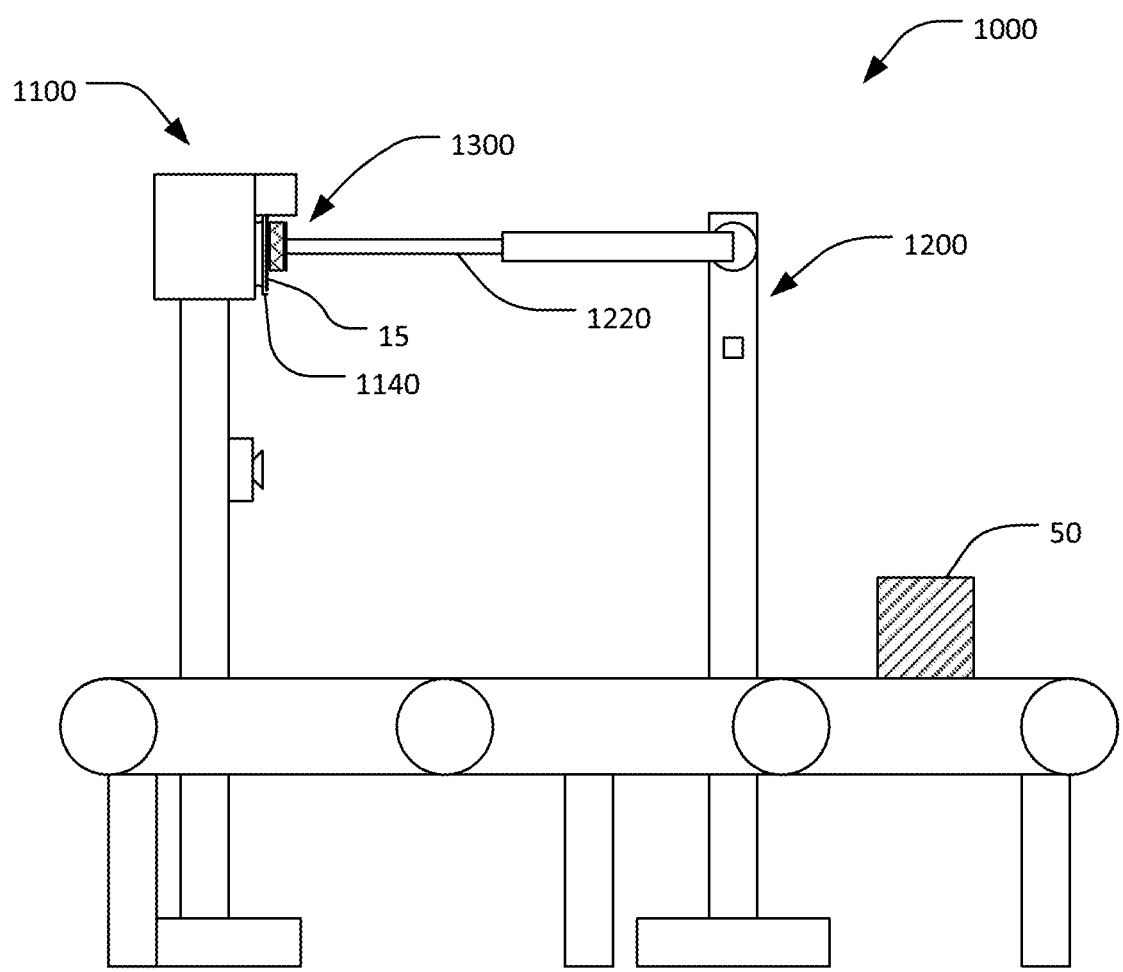
FIGS. 16, 17, 18, and 19 illustrate example operation of the label printing and applying system of FIG. 11, in an embodiment.

FIG. 15 is a flowchart depicting a method 1400 of printing labels and applying these labels to substrates, in an example embodiment. First, at step 1420, a label 100 may be printed using the printer 1120 and deposited within the holding tray 1140. For example, as discussed above, the label 100 may be held within the holding tray 1140 using a laterally extending edge 1140A, a vacuum, et cetera.

Figure 11:
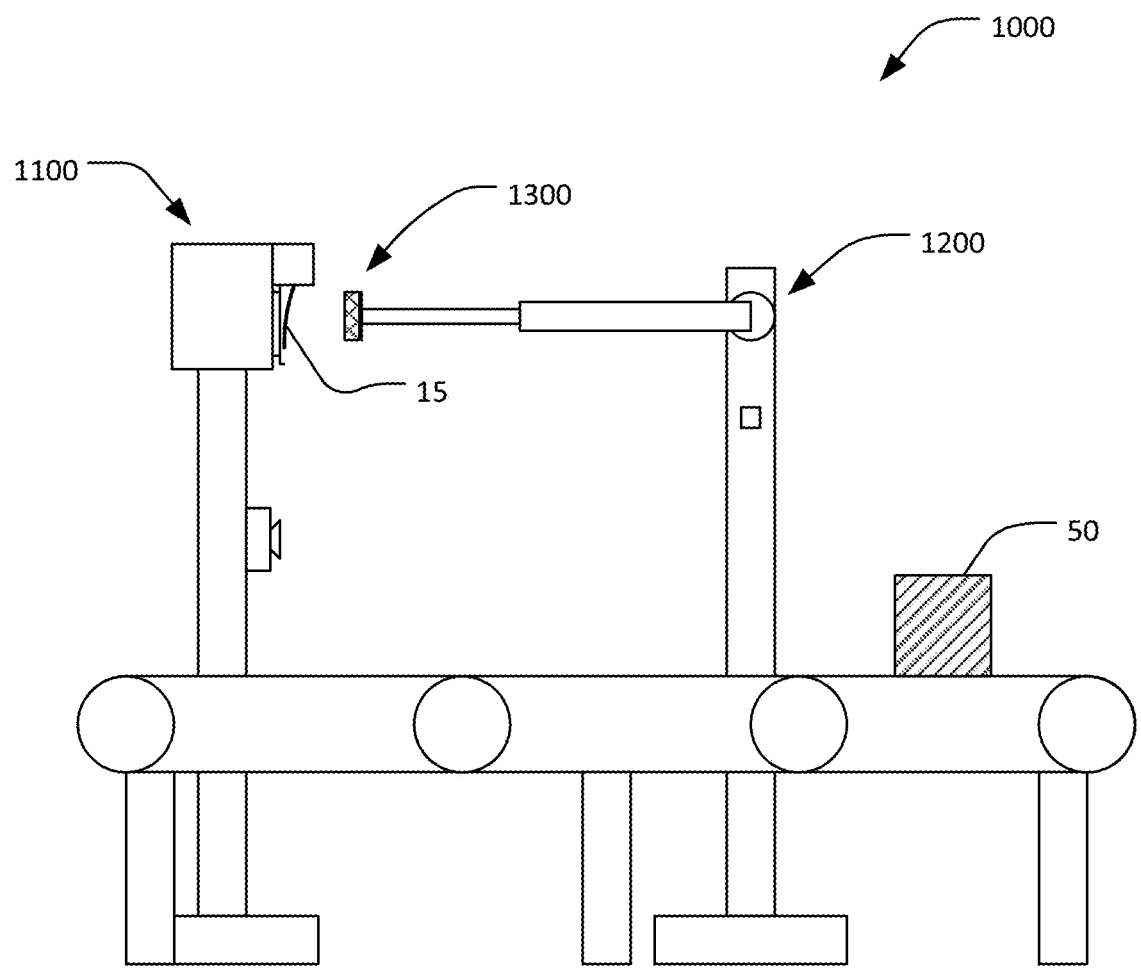
FIG. 11 is a side view of a label printing and applying system, according to an embodiment of the disclosure.

FIG. 11 shows the automated arm 1200 in its initial or original position. At step 1440, once the label 100 is printed and held in the holding tray 1140 as shown in FIGS. 11-12, the automated arm 1200 and/or a portion thereof may extend (e.g., horizontally) to an intermediate position. For example, the telescoping plunger 1220 may telescope and/or otherwise extend in the horizontal plane to a first position such that the tamp head 1300 contacts the label 100 being held in the holding tray 1140 (see FIG. 16) for collection. Alternately, the plunger 1220 may be brought proximate the label 100 in the holding tray 1140 so that the label adheres to the tamp head 1300 by virtue of a vacuum.

At step 1460, once the tamp head 1300 has collected the label 100 from the holding tray 1140, the rotatable arm 1200 may rotate (towards the substrate 50 to another intermediate position) while the label 100 is secured to the tamp head 1300 (e.g., via a vacuum), and resultantly, remove the label 100 from the tray 1140. At step 1480, as soon as the label 100 is removed from the tray 1140, printing of the next label 100N by the printer 1120 may be initiated.

Figure 17:
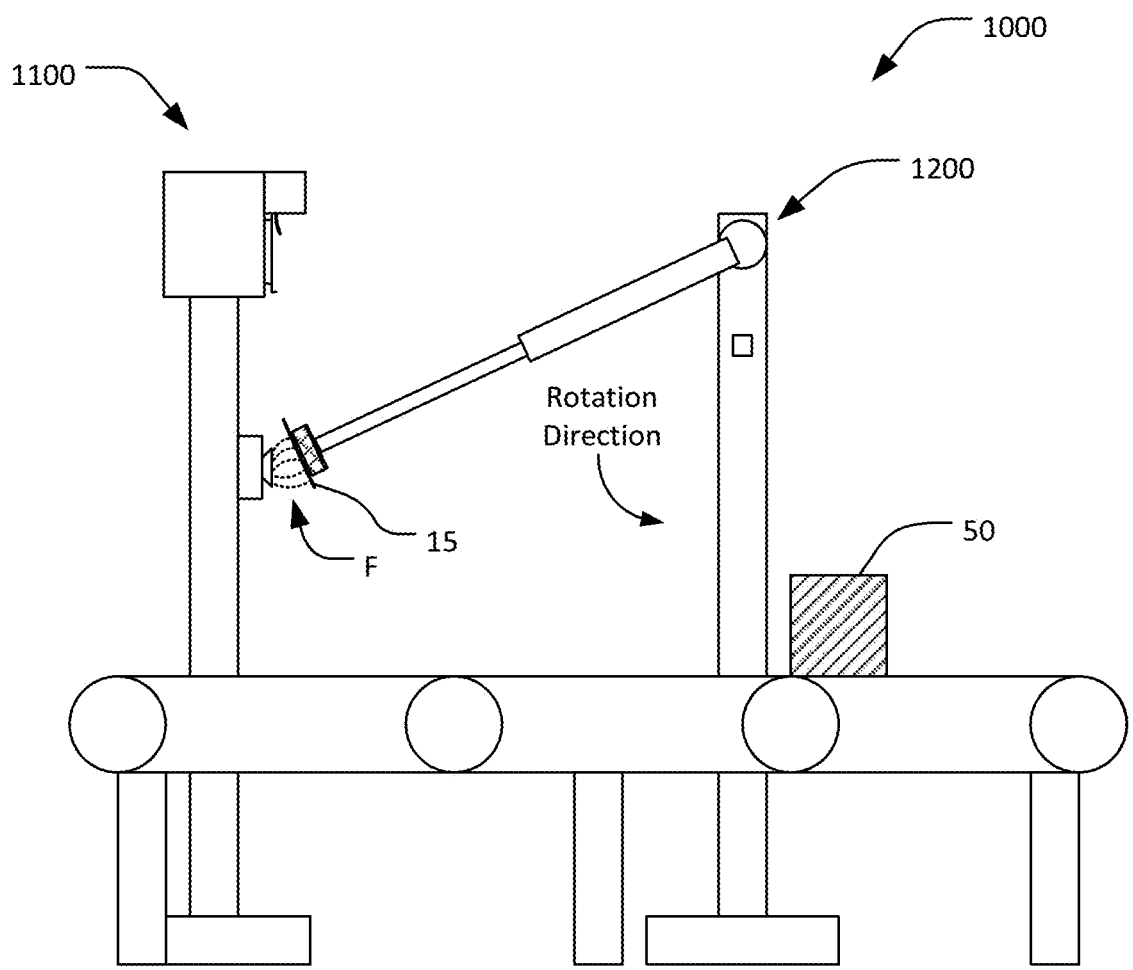
Figure 17A:
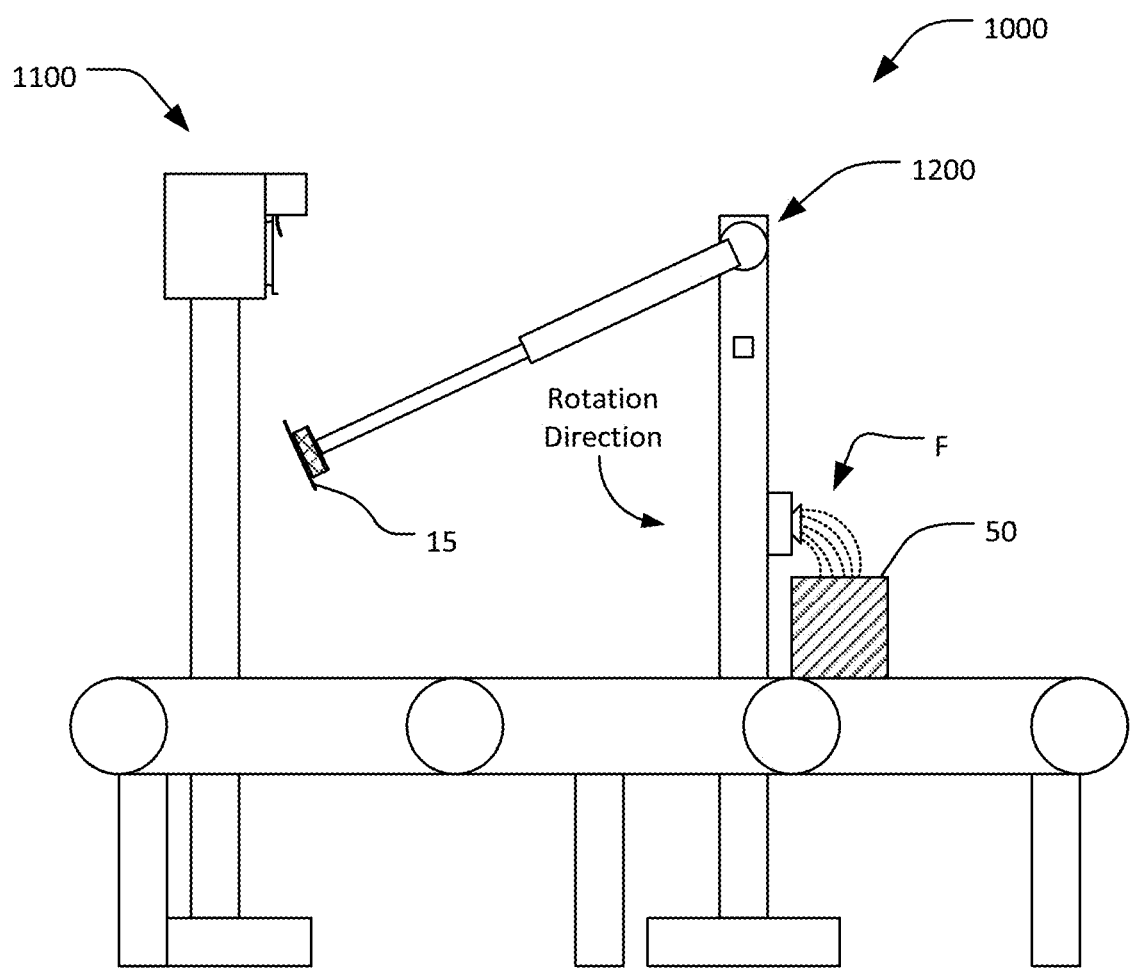
FIG. 17A illustrates example operation of another label printing and applying system, in an embodiment.

At step 1500, fluid may be sprayed onto the label 100 and/or on the substrate 50 (which substrate 50 may be moving on the conveyer belt) by the sprayer 1160 to allow for the displaceable liner at the underside of the label to be activated. For example, the rotatable arm 1200 may continue to rotate towards the substrate 50 while the label 100 is adhered to the tamp head 1300 and resultantly bring the label 100 proximate the sprayer 1160 (see FIG. 17) in another intermediate position. The sprayer 1160 may spray fluid F (e.g., water) on the label 100 to dispel the displaceable liner thereon. Alternately or additionally, the sprayer 1160 may spray the fluid F onto the substrate 50 itself so that the moistened substrate 50 may dispel the displaceable liner on the label 100 when the label 100 is brought in contact therewith, as shown in FIG. 17A.

Figure 18:
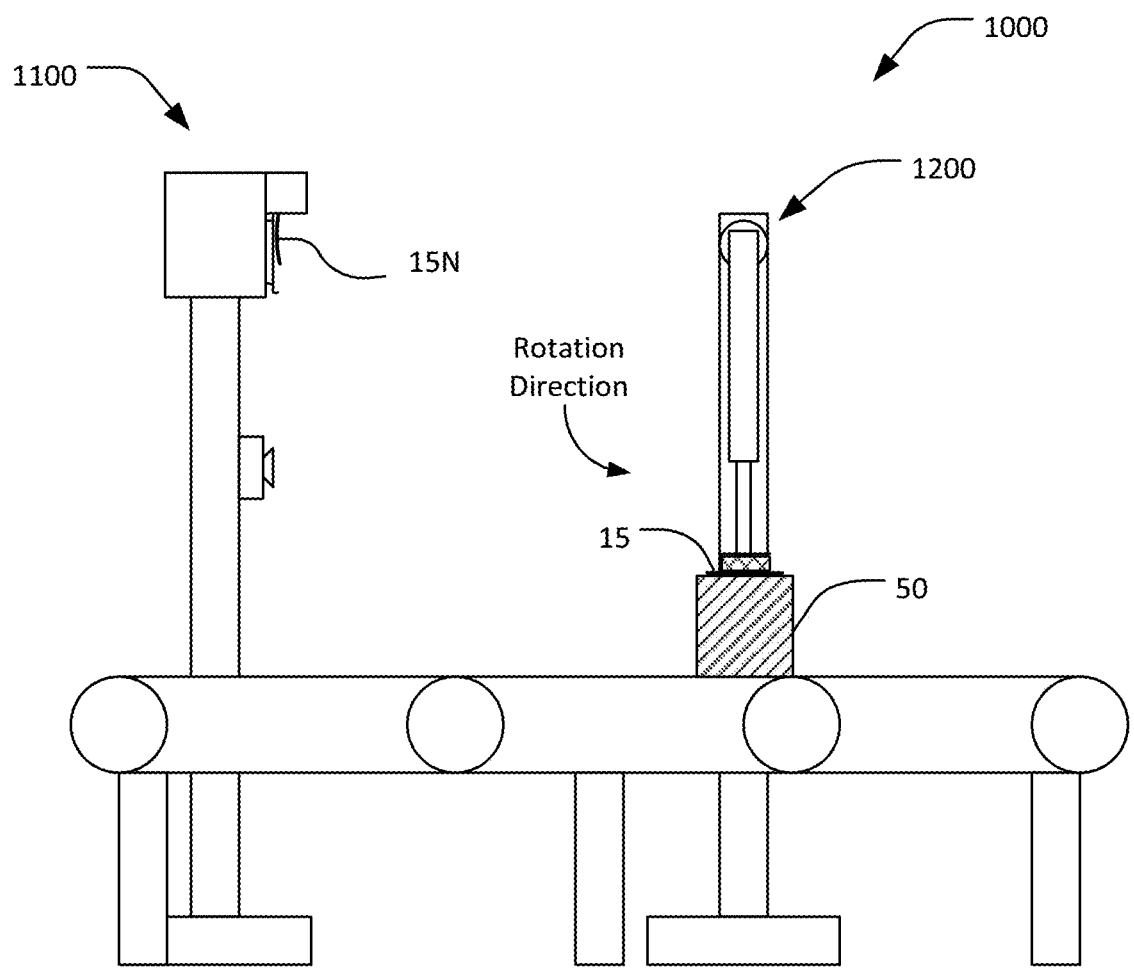

At step 1520, the rotatable arm 1200 may continue to rotate towards the substrate 50, and eventually, the movable plunger 1220 may cause the tamp head 1300 to sandwich the label 100 between the substrate 50 and the tamp head 1300 (see FIG. 18). This position of the arm 1200 may be referred to as the second position. When the underside of the label 100 contacts the substrate 50, the moisture on the underside of the label 100 and/or on the substrate 50 may cause the displaceable liner coating disposed on the label 100 to dissolve into the substrate 50 to adhere thereto (e.g., by nature of the label 100 exposed adhesive, by nature of the label 100 displaceable liner infiltrating the substrate 50 and drying therein, et cetera).

Figure 19:
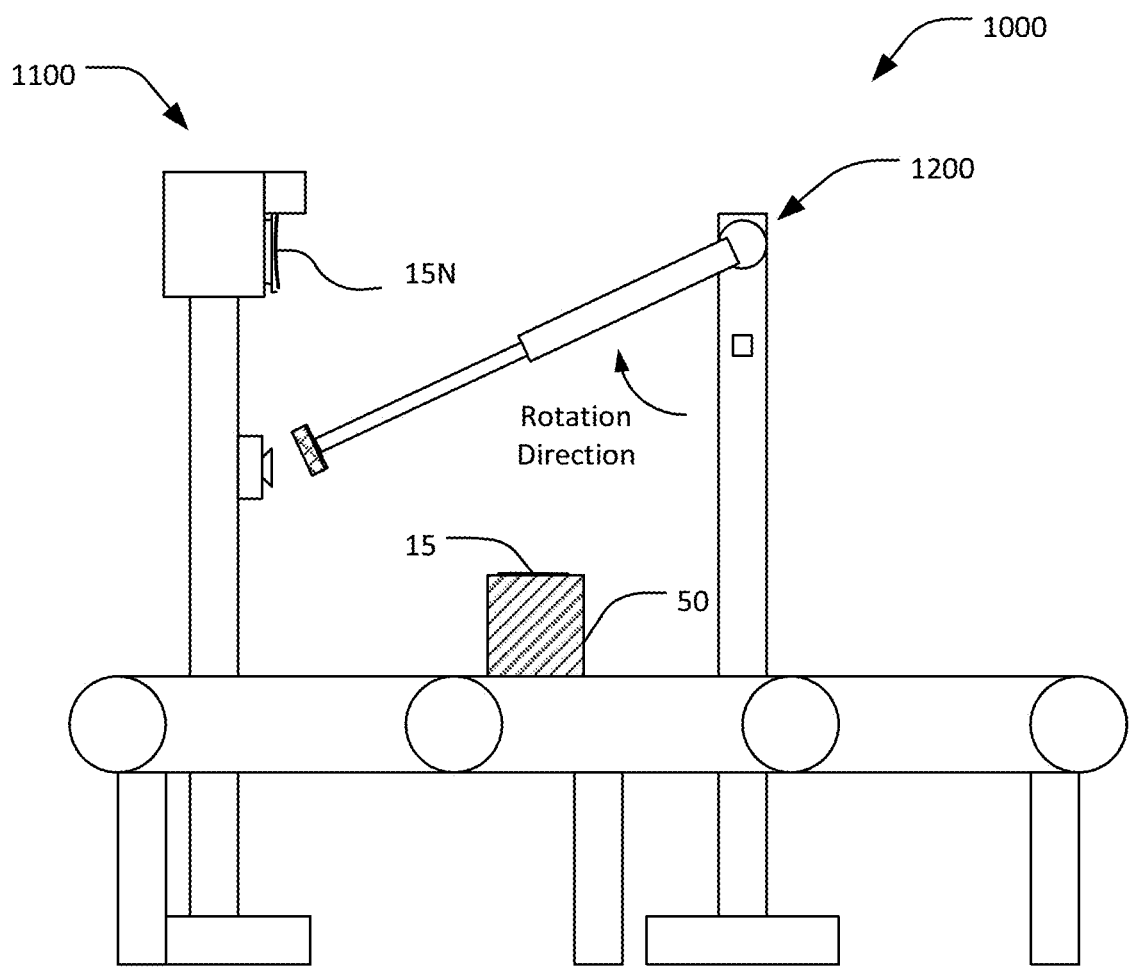

At step 1560, once the label 100 is adhered, the rotatable arm 1200 may return to its original position (see FIG. 19 showing the arm 1200 returning to its original position). By this time, the printer 1120 may already have printed the next label 100N in its entirety and deposited same into the tray 1140. Alternately, the printer 1120 may have printed at least part of the next label 100N. The rotatable arm 1200 may therefore collect the next label 100N from the tray 1140, and apply the next label 100N to the next substrate 50 as discussed above. In this way, the waiting time requirement may be eliminated or at least greatly reduced, allowing for a greater number of labels to be printed and applied to substrates in a given time period compared to the prior art, yielding significant cost savings.

The artisan would understand that the steps of the method 1400 need not be carried out in the exact order as described, that some steps may occur simultaneously with other steps, and that some steps may be optional, and that each of these combinations of carrying out the method 1400 are within the scope of the present disclosure. For example, spraying of the fluid F by the sprayer 1160 at step 1500 may be unnecessary where a traditional paper liner is being used as opposed to a displaceable liner.

Figure 20:
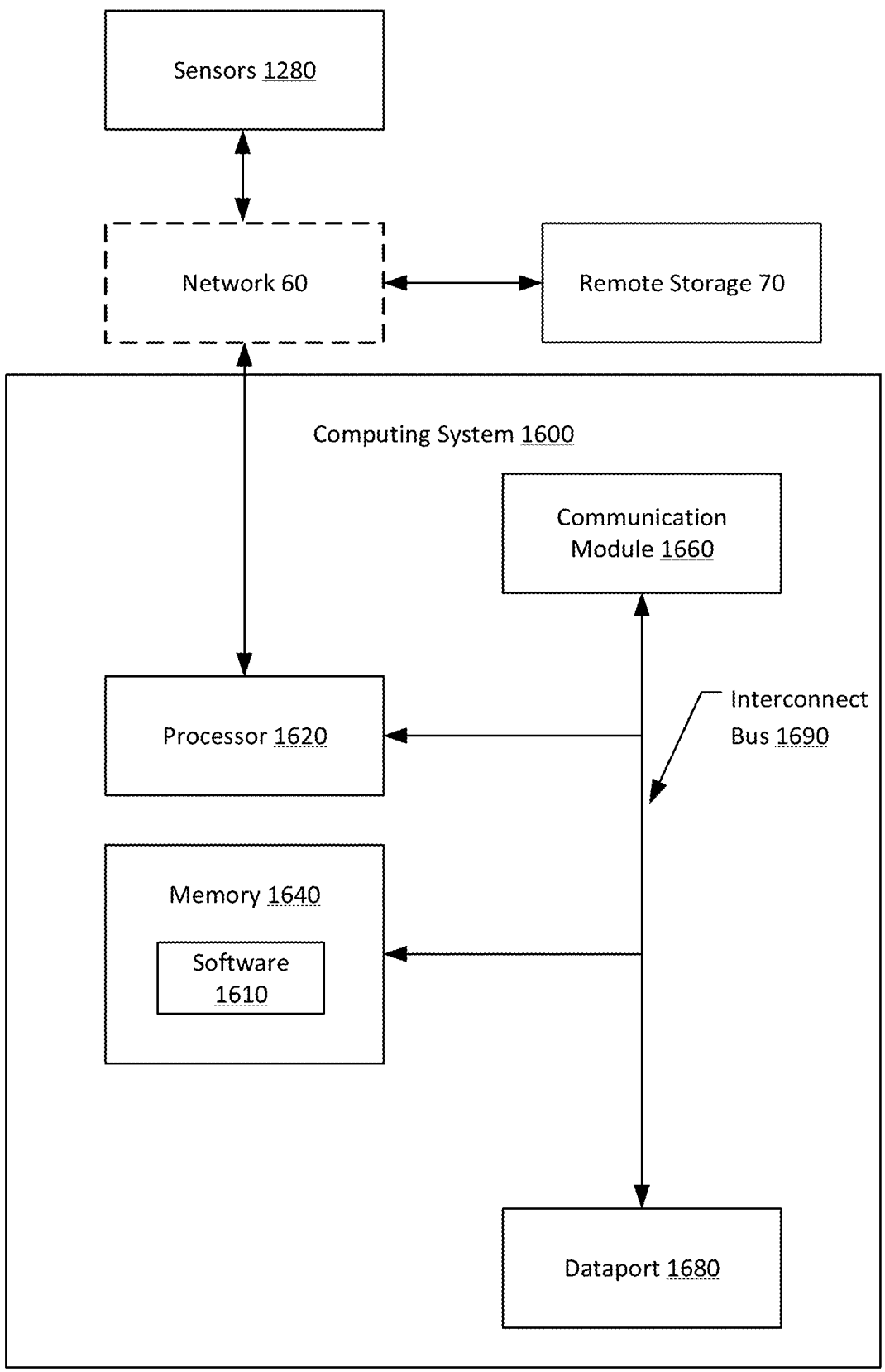
FIG. 20 is a block diagram illustrating a computing system of the label printing and applying system of FIG. 11.

FIG. 20 is a functional block diagram of the computing system 1600 which may be used to implement the various labeling apparatus embodiments according to the different aspects of the present disclosure. The computing system 1600 may be, for example, a smartphone, a laptop computer, a desktop computer, a flexible circuit board, or other computing device whether now known or subsequently developed. The computing system 1600 comprises a processor 1620, the memory 1640, a communication module 1660, and a dataport 1680. These components may be communicatively coupled together by an interconnect bus 1690. The processor 1620 may include any processor used in smartphones and/or other computing devices, including an analog processor (e.g., a Nano carbon-based processor). In certain embodiments, the processor 1620 may include one or more other processors, such as one or more microprocessors, and/or one or more supplementary co-processors, such as math co-processors.

The memory 1640 may include both operating memory, such as random access memory (RAM), as well as data storage, such as read-only memory (ROM), hard drives, optical, flash memory, or any other suitable memory/storage element. The memory 1640 may include removable memory elements, such as a CompactFlash card, a MultiMediaCard (MMC), and/or a Secure Digital (SD) card. In certain embodiments, the memory 1640 includes a combination of magnetic, optical, and/or semiconductor memory, and may include, for example, RAM, ROM, flash drive, and/or a hard disk or drive. The processor 1620 and the memory 1640 each may be located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1620 may be connected to the memory 1640 via the dataport 1680.

The communication module 1660 may be configured to handle communication links between the computing system 1600 and other external devices or receivers, and to route incoming/outgoing data appropriately. For example, inbound data from the dataport 1680 may be routed through the communication module 1660 before being directed to the processor 1620, and outbound data from the processor 1620 may be routed through the communication module 1660 before being directed to the dataport 1680. The communication module 1660 may include one or more transceiver modules configured for transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, 5G, or any other protocol and/or technology.

The dataport 1680 may be any type of connector used for physically interfacing with a smartphone, computer, and/or other devices, such as a mini-USB port or an IPHONE®/IPOD® 30-pin connector or LIGHTNING® connector. In other embodiments, the dataport 1680 may include multiple communication channels for simultaneous communication with, for example, other processors, servers, and/or client terminals.

The memory 1640 may store instructions for communicating with other systems, such as a computer. The memory 1640 may store, for example, a program (e.g., computer program code) adapted to direct the processor 1620 in accordance with the embodiments described herein. The instructions also may include program elements, such as an operating system. While execution of sequences of instructions in the program causes the processor 1620 to perform the process steps described herein, hard-wired circuitry may be used in place of, or in combination with, software/firmware instructions for implementation of the processes of the present embodiments. Thus, unless expressly noted, the present embodiments are not limited to any specific combination of hardware and software.

In embodiments, the memory 1640 includes software 1610. The software 1610 may contain machine-readable instructions configured to be executed by the processor 1620. The software 1610 may, for example, process data obtained from the sensor 1280. In embodiments, the software 1610 may cause the computing system 1600 to dynamically respond to a reading obtained by the sensor 1280. For example, the software 1610 may direct the automated arm 1200 to collect a label in response to a sensor 1280 determination that the label has been deposited in the holding tray 1140. As another example, the software 1610 may direct the automated arm 1200 to bring the label into contact with the substrate 50 in response to a sensor 1280 determination that the substrate 50 is ready to receive the label (i.e., the substrate 50 is within reach of the automate arm 1200).

The computing system 1600 may be in data communication with a remote storage 70 over a network 60. The network 60 may be a wired network, a wireless network, or comprise elements of both. In embodiments, the network 60 may communicatively link one or more components of the labeling apparatus 1000. For example, the sensor 1280 may be communicatively linked to the computing system 1600 via the network 60 for the exchange of information therebetween. The remote storage 70 may be, for example, the "cloud" or other remote storage in communication with other computing systems. In embodiments, data (e.g., readings obtained by the sensor 1280 and the dynamic responses of the computing system 1600 thereto) may be stored in the remote storage 70 for analytics.

As noted, one advantage of the labeling system 1000 may be that it may allow a printer to continuously print labels while the tamp head is moving between the printer and a desired surface for label application. Conversely, printers on existing label applicator systems may only be able to print off the next label for application once the tamp head has returned to the printer. Because the next label in an automatic label applicator system 1000 may be ready and waiting for pick up by the tamp head as soon as the tamp head completes its cycle, there may be a significant reduction in the time it takes to apply a large number (e.g., thousands) of labels, relative to existing label application systems.

While example labels (e.g., shipping labels), are used to illustrate the workings of the system 1000, the artisan will understand that the automatic label applicator system 1000 disclosed herein may be adapted to other similar label application functions, and that such adaptions are within the scope of the present disclosure. Examples of other similar label application functions may include pharmaceutical packaging, food and beverage packaging, parts labeling, etc.

The artisan will understand that the labeling system 1000 disclosed herein may include or have associated therewith electronics (e.g., the computing system 1600, the sensors 1280, etc.). The electronics may be used to control and modify the operation of the labeling system (e.g., to change the timing of the system 1000, to turn the system 1000 on and off, to dynamically control the system 1000 in response to a sensor 1280 detection, et cetera). In some example embodiments, the processor or processors may be configured through particularly configured hardware, such as an application specific integrated circuit (ASIC), field-programmable gate array (FPGA), etc., and/or through execution of software to allow the labeling system 1000 to function in accordance with the disclosure herein.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims. Not all steps listed in the various figures need be completed in the specific order described.

The disclosure claimed is:

1. A method of making a label for securement to a substrate comprising:
   providing a face ply having a top side and a bottom side, the face ply top side being configured to receive printed indicia;
   disposing a pressure sensitive adhesive on said bottom side in a pattern;
   formulating a liner coating configured to be activated by a fluid;
   disposing said liner coating on said bottom side outwardly adjacent said pressure sensitive adhesive;
   disposing a hydrophilic coating on said bottom side inwardly adjacent said pressure sensitive adhesive; and
   wherein, said bottom side is configured to be secured to said substrate via said pressure sensitive adhesive upon activation of said liner coating by said fluid.

2. The method of claim 1, wherein formulating said liner coating comprises mixing together an enabler adhesive, a facilitator fluid, a stabilizer, and a slip agent.

3. The method of claim 2, wherein said enabler adhesive is a remoistenable adhesive.

4. The method of claim 2, wherein said facilitator fluid is activated carbon coconut water.

5. The method of claim 2, wherein said stabilizer is precipitated calcium carbonate.

6. The method of claim 2, wherein said stabilizer is gypsum.

7. The method of claim 2, wherein said slip agent is safflower oil.

8. The method of claim 2, wherein said slip agent is silicone.

9. The method of claim 1, wherein said hydrophilic coating facilitates displacing of said liner coating into recesses and crests of said pattern of said pressure sensitive adhesive upon activation of said liner coating.

10. The method of claim 1, wherein each of said pressure sensitive adhesive and said liner coating is disposed only on a perimeter of said bottom side, leaving a central area of said bottom side exposed for printing.

11. The method of claim 10, further comprising printing indicia on said central area and said top side.

12. The method of claim 11, wherein said central area is perforated.

13. A method of making a label for securement to a substrate comprising:
   providing a face ply having a top side and a bottom side;
   disposing a hotmelt adhesive on said bottom side in a pattern;
   formulating a liner coating configured to be activated by a fluid;
   disposing a hydrophilic coating on said bottom side inwardly adjacent said hotmelt adhesive; and
   disposing said liner coating on said bottom side outwardly adjacent said hotmelt adhesive;
   wherein, said bottom side is configured to be secured to said substrate via said hotmelt adhesive upon activation of said liner coating by said fluid.

14. The method of claim 13, further comprising spraying water on said substrate to activate said liner coating.

15. The method of claim 13, further comprising spraying water on said bottom side to activate said liner coating.

16. The method of claim 13, wherein said hydrophilic coating facilitates displacing of said liner coating into recesses and crests of said pattern of said hot melt adhesive upon activation of said liner coating.

17. A method of making a label for securement to a substrate comprising:
- providing a face ply having a top side and a bottom side;
- formulating a liner coating configured to be activated by a fluid, said liner coating comprising each of an enabler adhesive, a facilitator fluid, and a stabilizer; and
- disposing said liner coating on said bottom side;
- wherein, said bottom side is configured to be secured to a substrate upon activation of said liner coating by said fluid.

* * * * *